[12] United States Patent
Yee et al.

(10) Patent No.: US 8,602,141 B2
(45) Date of Patent: Dec. 10, 2013

(54) VEHICLE POWER SYSTEM WITH FUEL CELL AUXILIARY POWER UNIT (APU)

(75) Inventors: Justin Yee, Portland, OR (US); Mark S. Woolley, Portland, OR (US); Cristin Paun, Portland, OR (US); Shivkumar Duraiswamy, Portland, OR (US); Maik Ziegler, Portland, OR (US); Derek James Rotz, Portland, OR (US); Matthew C. C. Rogers, Portland, OR (US)

(73) Assignee: Daimler Trucks North America LLC, Portland, OR (US)

( * ) Notice: Subject to any disclaimer, the term of this patent is extended or adjusted under 35 U.S.C. 154(b) by 314 days.

(21) Appl. No.: 13/080,210

(22) Filed: Apr. 5, 2011

(65) Prior Publication Data

US 2011/0246013 A1 Oct. 6, 2011

Related U.S. Application Data

(60) Provisional application No. 61/321,051, filed on Apr. 5, 2010.

(51) Int. Cl.
*B60K 31/12* (2006.01)
(52) U.S. Cl.
USPC ............ 180/65.21; 322/23; 701/22; 60/698; 60/706
(58) Field of Classification Search
None
See application file for complete search history.

(56) References Cited

U.S. PATENT DOCUMENTS

| | | | |
|---|---|---|---|
| 5,318,142 A | 6/1994 | Bates et al. | |
| 5,898,282 A | 4/1999 | Drozdz et al. | |
| 5,929,595 A | 7/1999 | Lyons et al. | |
| 5,998,885 A | 12/1999 | Tamor et al. | |
| 6,230,496 B1 | 5/2001 | Hofmann et al. | |
| 6,242,873 B1 | 6/2001 | Drozdz et al. | |
| 6,313,394 B1 | 11/2001 | Shugar et al. | |
| 6,326,763 B1 | 12/2001 | King et al. | |
| 6,393,354 B1 | 5/2002 | Scheffler et al. | |
| 6,484,830 B1 | 11/2002 | Gruenwald et al. | |
| 6,522,955 B1 | 2/2003 | Colborn | |
| 6,580,977 B2 | 6/2003 | Ding et al. | |
| 6,588,211 B2 | 7/2003 | Friebe et al. | |
| 6,629,027 B2 | 9/2003 | Yamaguchi et al. | |
| 6,649,289 B2 | 11/2003 | Hsu et al. | |
| 6,662,890 B2 | 12/2003 | Schmidt | |
| 6,684,135 B2 | 1/2004 | Uenodai et al. | |
| 6,795,756 B1 | 9/2004 | Zhang et al. | |
| 6,847,127 B1 | 1/2005 | Lee | |
| 6,945,345 B2 | 9/2005 | Meaney, Jr. | |
| 6,953,100 B2 | 10/2005 | Aberle et al. | |
| 6,959,777 B2 | 11/2005 | Beckerman et al. | |
| 7,014,930 B2 | 3/2006 | Daniel et al. | |
| 7,137,344 B2 | 11/2006 | Kumar et al. | |
| 7,195,282 B2 | 3/2007 | Mizuno | |
| 7,347,168 B2 | 3/2008 | Reckels et al. | |
| 7,413,044 B2 | 8/2008 | Uenodai et al. | |
| 7,424,868 B2 | 9/2008 | Reckels et al. | |
| 7,492,055 B2 | 2/2009 | Chiao | |

(Continued)

*Primary Examiner* — Thomas Tarcza
*Assistant Examiner* — Richard Goldman
(74) *Attorney, Agent, or Firm* — Klarquist Sparkman, LLP

(57) ABSTRACT

A power distribution system comprises at least one fuel cell that is selectively operated in response to conditions to provide power to electrical loads and/or to charge an electrical storage device such as a vehicle battery. One form of an alternator can be selectively engaged or disengaged to provide power to the electrical loads and/or to charge the electrical storage device. Either or both of the fuel cell and alternator can be operated to provide electrical power.

49 Claims, 5 Drawing Sheets

(56) References Cited

U.S. PATENT DOCUMENTS

| | | |
|---|---|---|
| 2003/0105562 A1 | 6/2003 | Hsiao et al. |
| 2004/0018399 A1 | 1/2004 | Jung |
| 2005/0034905 A1 | 2/2005 | Gunther et al. |
| 2005/0218135 A1 | 10/2005 | Kraemer et al. |
| 2005/0228553 A1 | 10/2005 | Tryon |
| 2006/0005736 A1 | 1/2006 | Kumar |
| 2006/0124275 A1 | 6/2006 | Gosse et al. |
| 2007/0000703 A1 | 1/2007 | Hughes et al. |
| 2007/0161455 A1 | 7/2007 | King et al. |
| 2007/0190377 A1 | 8/2007 | Elwart et al. |
| 2008/0218104 A1 | 9/2008 | Lukie et al. |
| 2008/0246436 A1 | 10/2008 | Fischer et al. |
| 2008/0277175 A1 | 11/2008 | Tyler et al. |
| 2009/0008167 A1 | 1/2009 | Aoyagi et al. |
| 2010/0049400 A1 | 2/2010 | Duraiswamy et al. |
| 2011/0184642 A1 | 7/2011 | Rotz et al. |

VEHICLE POWER SYSTEM WITH FUEL CELL AUXILIARY POWER UNIT (APU)

CROSS REFERENCE TO RELATED APPLICATION

This application claims the benefit of U.S. Provisional Application No. 61/321,051 entitled VEHICLE POWER SYSTEM WITH INTEGRATED FUEL CELL AUXILIARY POWER UNIT (APU), filed on Apr. 5, 2010, and which is incorporated by reference herein.

FIELD

This disclosure relates to vehicle electrical power systems that have an internal combustion engine powered alternator and a fuel cell for providing electrical power.

BACKGROUND

Current trucks typically use engine driven alternators as the main electrical energy production device and a stack of batteries for energy storage. Known alternators are typically continuously drivenly coupled to the engine crankshaft to provide power when the vehicle engine is running for the vehicle's electrical loads and to charge the battery stack.

Alternators convert mechanical energy into electrical energy and alternators in trucks are understood to have a 100% duty cycle when a truck engine is running because of their continuous coupling to an engine crankshaft. The efficiency of a typical truck alternator can vary between 55% and 75%, depending upon engine speed and electrical load, which leads to a fuel penalty. For example, consider a Class 8 tractor-trailer combination cruising at 60 MPH on the highway. An exemplary engine speed at 60 MPH is approximately 1400 RPM in the top gear. On average, a common vehicle electrical load can consume about 100 amperes at highway speeds. This implies that a 12 volt alternator has to generate 1.2 kW of electrical energy (12 V×100 A=1.2 kW). Taking into account the efficiency of the alternator (e.g., 55% nominal efficiency at an engine speed of 1400 RPM) and belt (e.g., approximately 98% in the case of a belt driven alternator), the total power required from the engine crankshaft to meet this electrical load would be about 2.2 kW (1.2 kW/[0.55×0.98]) =2.2 kW. When engine inefficiencies are also considered, an efficiency calculation can be as follows:

(engine efficiency)×(belt efficiency)×(alternator efficiency)=(40%)×(98%)×(55%)=21.6% efficient Class 8 Trucks typically have a bank of 4 batteries for starting. Trucks that have an electric powered parked heating ventilation and air conditioning (HVAC) system often use an additional battery pack consisting of a set of 4 deep cycle batteries. Typical deep cycle batteries in land vehicles are sized at 105 Amp-hrs, last about 500 cycles, and cannot be fully discharged without damaging the battery. All the electrical loads on the truck are met by the battery packs which are kept charged by the alternator. The electrical loads include all of the so-called hotel loads, such as coffee maker, microwave, stereo, lamps, relays, parked HVAC loads, etc.

Some auxiliary power systems, or units (APUs) are powered by a small diesel internal combustion engine. Although they can meet the electrical requirements of a truck or other vehicle, such as when the vehicle is parked, diesel engine APUs require consistent maintenance and have significant emissions, which can require particulate filters to meet emission standards. While quieter than idling the main engine, diesel engine APUs are still relatively noisy and create vibrations that potentially can keep drivers from sleeping soundly. Although they can be used as an APU, these factors make them less desirable for use as a vehicle auxiliary power unit.

A need exists for improvements in vehicle power systems and auxiliary power systems to power vehicle hotel electrical loads.

SUMMARY

In accordance with one aspect of this disclosure, a vehicle power system comprises a fuel cell that can be shifted between a plurality of modes based upon a number of conditions. These conditions can comprise vehicle operating conditions and/or environmental conditions. The vehicle operating conditions can comprise one or more of the following: whether a vehicle engine is running; the state of charge of an energy storage device; and the state of a command signal. In addition, electrical loads on the system can be disconnected and/or reconnected with changes in electrical loads affecting the shifting of the fuel cell between modes of operation. In an embodiment where an automatic engine start feature is included, starting of the engine can affect shifting of the fuel cell between modes. Also, the quantity of fuel on the vehicle is another condition upon which shifting of the fuel cell between modes can be based. Environmental conditions can include the road grade presently being encountered by the vehicle and/or predictively to be encountered by the vehicle. In addition, a continuously driven or selectively driven engagable/disengagable alternator can also be used. The operation of the alternator can also impact the shifting of the fuel cell between modes.

In accordance with a further embodiment, a vehicle power system can comprise a plurality of electrical loads that consume electrical energy from the vehicle power system; an energy storage device for storing electrical energy from the vehicle power system and providing stored electrical energy to the vehicle power system, the energy storage device having a state of charge; an internal combustion engine; an alternator comprising a first power mode wherein the alternator is driven by the engine to convert mechanical energy from the engine into electrical energy that is provided to the vehicle power system, the alternator comprising a second non-power mode in which the alternator does not provide electrical energy to the vehicle power system; and a fuel cell having a plurality of fuel cell modes comprising a Power Mode wherein the fuel cell converts fuel into electrical energy that is at least selectively provided to the vehicle power system, and at least a second mode wherein the fuel cell does not provide electrical energy to the vehicle power system. In this embodiment, a vehicle power system controller coupled to the alternator and to the fuel cell is operable to control the production and distribution of electrical energy in the vehicle power system, the controller being configured to, based upon the electrical energy consumption of the electrical loads and the state of charge of the energy storage device, shift the alternator between the first power mode and the second non-power mode and to shift the fuel cell between the plural fuel cell modes. The alternator can be a field clutched alternator. In one form, the alternator can be switched to the second non-power mode state by opening an alternator external sense circuit and the alternator can be switched to the first power mode state by closing the alternator external sense circuit. In addition, the fuel cell can be a solid oxide fuel cell.

Furthermore, the plurality of modes of the fuel cell can comprise an Off Mode, a Startup Mode, a Power Mode, and a Shutdown Mode and wherein the vehicle power system controller controls the shifting of the fuel cell at least from the Off Mode to the Startup Mode and from the Power Mode to the Shutdown Mode. In addition, the engine can be a diesel fueled engine and the fuel cell can comprise a fuel reformer operable to convert diesel fuel into a hydrogen fuel for the fuel cell. The system controller is desirably responsive to a plurality of conditions including the state of an on/off signal to selectively shift the fuel cell between the plurality of modes.

In accordance with another aspect of an embodiment, the vehicle power system controller can selectively control the production of energy from the fuel cell and from the alternator to be solely from the fuel cell under conditions wherein the state of charge of the energy storage device is at or above a threshold, wherein the fuel cell is in the Power Mode and has the capacity to supply the electrical energy requirements of all of the electrical loads, and wherein it is more efficient to provide electrical energy from the fuel cell than to provide electrical energy from the alternator. As a further alternative, the vehicle power system controller can selectively control the production of energy to be from both the fuel cell and the alternator under conditions wherein the state of charge of the energy storage device is at or above the threshold, the fuel cell is in the Power Mode, but the fuel cell lacks the capacity to meet the electrical energy requirements of all of the loads.

As another aspect of an embodiment, the vehicle system controller can selectively control the production of electrical energy to be solely from the alternator under conditions wherein the state of charge of the energy storage device is less than a threshold.

As yet another aspect of an embodiment, if the alternator is in the second non-power mode and the engine is running, the system controller can shift the alternator to the first power mode if at least one condition is met. The at least one condition that is met can comprise any one or more of the following conditions: (a) the fuel cell is in a Startup Mode wherein the fuel cell is not producing electrical energy for distribution to the electrical loads; and (b) the fuel cell is in the Power Mode and the state of charge of the electrical energy storage device is less than a threshold. In addition, the at least one condition that is met further can comprise (c) the fuel cell is in the Power Mode and one or more of the following conditions: (i) the road grade is downhill and steeper than a downhill threshold, (ii) the vehicle has a service brake and the service brake is engaged, and (iii) the vehicle has an engine brake that is active to apply a braking force to the engine. One example of a downhill threshold is a three percent downhill grade.

As another aspect of an embodiment, if the alternator is in the first power mode and the engine is running, the system controller shifts the alternator to the second non-power mode if at least one condition is met. The at least one condition that is met can comprise: the fuel cell is in the power mode and the battery state of charge is greater than or equal to a threshold. In addition, the at least one condition that is met further can comprise that the alternator has been in the power mode for at least a minimum time period.

In accordance with an embodiment, if the alternator is in the first power mode and the engine is running, the system controller can shift the alternator to the second non-power mode if the state of charge of the energy storage device is greater than a threshold and one or more of the following conditions are met: the road grade is not a downhill grade that is steeper downhill than a threshold, the vehicle has a throttle and the throttle position is greater than a throttle position threshold. As a further aspect of an embodiment, the system controller cannot shift the alternator from the first power mode to the second non-power mode unless the alternator has been in the first power mode for a time that is at least a minimum time period.

As a still further aspect of an embodiment, if the alternator is in the second non-power mode and the engine is running, the system controller shifts the alternator to the first power mode if any one or more of the following conditions are met: (a) the fuel cell is in a Startup Mode wherein the fuel cell is not producing electrical energy for distribution to the electrical loads; and (b) the fuel cell is in the Power Mode and the state of charge of the electrical energy storage device is less than a threshold; and (c) the fuel cell is in the Power Mode and one or more of the following conditions are met: (i) the road grade is downhill and steeper than a downhill threshold; the vehicle has a service brake and the service brake is engaged; and (iii) the vehicle has an engine brake that is active to apply a braking force to the engine; and wherein if the alternator is in the first power mode and the engine is running, the system controller shifts the alternator to the second non-power mode if at least one or more of the following conditions are met: (a) the fuel cell is in the Power Mode and the battery state of charge is greater than or equal to a threshold and the alternator has been in the first power mode for at least a minimum time period; and (b) if the state of charge of the energy storage device is greater than a threshold and the alternator has been in the first power mode for at least a minimum time period; and one or more of the following conditions are met: the road grade is not a downhill grade that is steeper downhill than a threshold, the vehicle has a throttle and the throttle position is greater than a throttle position threshold.

In accordance with an exemplary embodiment, a vehicle power system can comprise an internal combustion engine; a starter coupled to the internal combustion engine and that is operable to crank the engine in response to delivery of a crank engine current to the starter; a switchable power output alternator that is operable in response to an alternator control signal to shift from a first power mode in which the alternator is driven by the engine to produce output power at an alternator output and a second non-power mode in which the alternator is not driven by the engine to produce output power; and an energy storage device coupled to the alternator output and to vehicle electrical loads. In addition, this embodiment also comprises a fuel cell that is coupled to the energy storage device and to the vehicle electrical loads and a system controller coupled to the fuel cell and to the energy storage device. The system controller can be operable to selectively provide alternator control signals to the alternator to control the shifting of the alternator from the first power mode to the second non-power mode and from the second non-power mode to the first power mode, the system controller can also be operable to selectively provide an engine start signal to cause the engine to start, the system controller selectively controlling the shifting of the alternator to the first power mode and the starting of the engine so as to control the production of alternator output current. The fuel cell can be operable to produce electrical power when the fuel cell is in a Power Mode. In addition, the system controller can be operable to selectively control the delivery of power from the alternator, power from the fuel cell, and power from both the alternator and the fuel cell to the energy storage device and to the electrical loads.

In accordance with one exemplary embodiment, a vehicle power system can comprise an internal combustion engine; a starter coupled to the internal combustion engine, the starter being operable to crank the engine to start the engine in response to the delivery of engine cranking electrical current to the starter; an alternator coupled to the engine and operable to produce an alternator current output when driven by the engine; and an energy storage device that is coupled to the alternator output and to vehicle electrical loads. In addition, this embodiment also comprises a fuel cell that is coupled to the energy storage device and to the vehicle electrical loads. The fuel cell can comprise an electrically powered fuel cell cooling mechanism that is selectively operable to cool the fuel cell. The fuel cell can comprise plural fuel cell modes comprising an Off Mode, in which the fuel cell is not producing output power; a Startup Mode in which the fuel cell is in transition to be shifted toward an operational state wherein the fuel cell produces output power; a Power Mode in which the fuel cell is at least selectively operable to produce output power; and a Shutdown Mode in which the fuel cell is shifted toward the Off Mode. The fuel cell is responsive to fuel cell mode signals to shift to selected fuel cell modes. A system controller is coupled to the fuel cell and to the energy storage device and is operable to provide the fuel cell mode control signals to the fuel cell to control the shifting of the fuel cell to the selected modes. In one embodiment, the system controller blocks the shifting of the fuel cell from the Off Mode to the Startup Mode under conditions comprising there is not at least enough power in the energy storage device to start the engine from a stopped state.

In accordance with another aspect of an embodiment, the system controller can alternatively or also block the shifting of the fuel cell from the Off Mode to the Startup Mode under conditions further comprising the engine is not running.

As a further aspect of an embodiment, the system controller can be responsive to an on/off command with the system controller providing a fuel cell mode control signal that blocks the shifting of the fuel cell from the Off Mode to the Startup Mode in response to a fuel cell off command.

As yet another aspect of an embodiment, the energy storage device can comprise at least one battery and the system controller can be operable to provide a fuel cell mode control signal that blocks the shifting of the fuel cell from the Off Mode to the Startup Mode if the state of charge of the battery is less than a first threshold. Also, the system controller can provide a fuel cell mode control signal that causes the fuel cell to commence shifting from the Startup Mode to the Shutdown Mode if the state of charge of the battery reaches a second threshold that is less than the first threshold.

As another aspect, the system controller can provide a fuel cell mode control signal to maintain the fuel cell in the Startup Mode if the state of charge of the battery reaches a third threshold that is less than the first threshold and greater than the second threshold, the internal combustion engine is running and the alternator is delivering power to the energy storage device, and wherein the electrical loads comprise hotel loads at a first level with the system controller causing the disconnect of at least selected hotel loads to reduce the magnitude of the electrical loads from the first level.

As a further aspect, the system controller can provide a fuel cell mode control signal to maintain the fuel cell in the Startup Mode if the state of charge of the battery reaches a fourth threshold that is less than the first threshold and greater than the second threshold, and the engine is not running, the system controller providing an engine start signal causing power to be delivered to the starter from the energy storage device to start the engine and cause the delivery of power from the alternator to the energy storage device with the fuel cell remaining in the Startup Mode. In accordance with an embodiment, the third and fourth thresholds can be the same.

As a further aspect, the system controller can provide a fuel cell mode control signal to maintain the fuel cell in the Startup Mode if the battery state of charge reaches the fourth threshold and the engine is running. In addition, the alternator can comprise a switchable power output alternator that is operable in response to an alternator control signal to shift from a first power mode in which the alternator is driven by the engine to produce output power at an alternator output and a second non-power mode in which the alternator is not driven by the engine to produce output power. In addition, the system controller can provide an alternator control signal to the alternator to cause the alternator to shift to the first power mode to provide alternator power, and with the fuel cell remaining in the Startup Mode.

In accordance with a further aspect, the system controller can also be responsive to an on/off command with the off command indicating the fuel cell should be turned off, wherein the system controller provides a fuel cell mode control signal to maintain the fuel cell in the Power Mode if the state of charge of the battery is at or below a fifth threshold even though the system controller has received a fuel cell off command. As yet another aspect, the fifth threshold can be greater than the first threshold. As a further aspect, the system controller can provide a fuel cell mode control signal to maintain the fuel cell in the Power Mode if the state of charge of the battery is at or below a sixth threshold and the system controller disconnects at least selected electrical loads from receiving electrical power. As a further aspect, the sixth threshold can be equal to the third threshold. The system controller can also cause the reconnecting of the disconnected electrical loads in the event the state of charge of the battery reaches or exceeds a seventh threshold. In addition, the seventh threshold can be equal to the fifth threshold.

As a further aspect of an embodiment, the system controller can provide an engine start signal to cause power to be delivered to the starter from the energy storage device to start the engine, the system controller also causing the delivery of power from the alternator to the energy storage device with the fuel cell remaining in the Power Mode.

As yet another aspect of an embodiment, the system controller can provide a fuel cell mode control signal to initiate shifting of the fuel cell from the Power Mode to the Shutdown Mode if the state of charge of the battery reaches a threshold, such as an eighth threshold level that is greater than the fifth threshold level. The eighth threshold level can correspond to a fully charged state of charge of the battery.

As a further aspect of an embodiment, the system controller can be operable to provide a fuel cell mode control signal to initiate shifting of the fuel cell from the Shutdown Mode to the Startup Mode if there is at least enough power in the energy storage device to start the engine from a stopped state, if the engine is running, and if the system controller receives a fuel cell on command.

In accordance with a further aspect of an embodiment, the system controller can be responsive to a fuel cell off command indicating that the fuel cell should be shut down, and wherein the system controller can be operable to provide a fuel cell mode control signal to initiate shifting of the fuel cell from the Power Mode to the Shutdown Mode in response to the fuel cell off command and if the battery state of charge is at or exceeds a threshold level that is greater than the fifth threshold level.

As another aspect, the system controller can be responsive to a low fuel signal to provide a fuel cell mode control signal to initiate shifting of the fuel cell from the Power Mode to the Shutdown Mode.

As a further aspect, the alternator can comprise an alternator that is continuously driven by the engine to produce an alternator current output whenever the engine is running. As yet another aspect, both alone and as a part of the power system, the alternator can be operable to be selectively driven by the engine to produce an alternator current output when driven by the engine and the engine is running. In accordance with this aspect, the alternator can comprise a switchable power output alternator that is operable in response to an alternator control signal to shift from a first power mode in which the alternator is driven by the engine to produce output power at an alternator output and a second non-power mode in which the alternator is not drivenly connected to the engine to produce output power, wherein the system controller is operable to selectively provide alternator control signals to the alternator to shift the alternator to the first power mode to control the alternator to produce an alternator output power and to shift the alternator to the non-power mode. In accordance with this latter aspect, the alternator can comprise a clutched alternator, and further can comprise a field clutched alternator.

In accordance with an embodiment of a method of controlling a vehicle power system, the vehicle power system comprising a plurality of electrical loads, a battery having a state of charge (SOC), an internal combustion engine with an alternator, a fuel cell having at least an Off Mode, a Startup Mode, a Power Mode and a Shutdown Mode, and an input for receiving commands to switch the fuel cell to the Power Mode or the Off Mode, the method comprises:
when the fuel cell is in the Off Mode:
if a received command is to switch the fuel cell on Power Mode and the SOC is less than or equal to a first threshold value or the engine is not running , then leaving the fuel cell in the Off Mode;
if a received command is to switch the fuel cell on Power Mode, the engine is running, and the SOC is greater than the first threshold value , then switching the fuel cell to the Startup Mode;
when the fuel cell is in the Startup Mode:
if the SOC is less than or equal to a second threshold value, then switching the fuel cell to the Shutdown Mode;
if the SOC is less than or equal to a third threshold greater than the second threshold value and the engine is not running, then starting the engine;
if the SOC is less than or equal to the third threshold value and the engine is running and the electrical energy consumption of the electrical loads is greater than a first level, then reducing the electrical energy consumption of the electrical loads below the first level;
if the temperature of the fuel cell reaches a fuel cell operating temperature, then switching the fuel cell to the Power Mode;
when the fuel cell is in the Power Mode:
if the SOC is less than or equal to the third threshold value, then reducing the electrical energy consumption of the electrical loads until the SOC reaches a fourth threshold value that is greater than the first threshold value;
if a received command is to switch the fuel cell off and the SOC is less than or equal to a fifth threshold value, then leaving the fuel cell in the Power Mode;
if a received command is to switch the fuel cell Power Mode off and the
SOC is greater than the fifth threshold value, then switching the fuel cell to the Shutdown Mode;
if the fuel level is less than a low fuel threshold level, then switching the fuel cell to the Shutdown Mode;
when the fuel cell is in the Shutdown Mode:
if the temperature of the fuel cell reaches a second temperature at which a fuel cell cooling mechanism can be turned off without damaging the fuel cell, then switching the fuel cell to the Off Mode; and if the received command is to switch the fuel cell on, the SOC is greater than the first threshold, the engine is running and the fuel is not less than a low fuel level, switching the fuel cell to the Startup Mode.

In accordance with an aspect of the above method, the second threshold value can be based on the minimum SOC needed to start the engine and to cool the fuel cell to a level that avoids damage to the fuel cell.

The foregoing and other objects, features and advantages of the invention will become more apparent from the following detailed description, which proceeds with reference to the accompanying figures.

DETAILED DESCRIPTION

Figure 1:
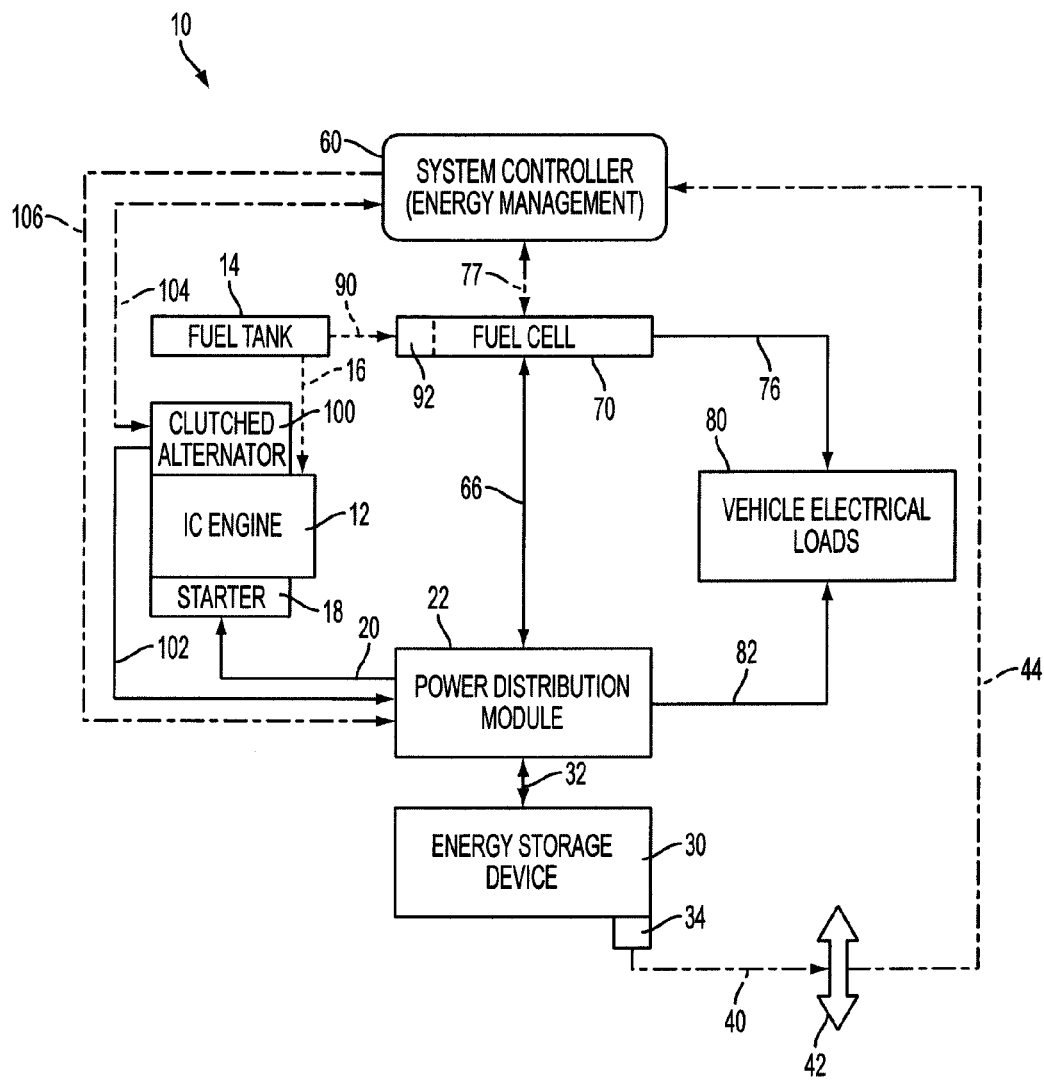
FIG. 1 is a schematic illustration of an exemplary power system for a land vehicle such as a truck.

Described herein are exemplary systems and methods for integrating a fuel cell (FC) system with several energy storage and production devices in a vehicle, such as a truck, to optimally manage the electrical power and electrical loads. Optimal management of the energy production devices and electrical loads can benefit fuel efficiency.

A fuel cell system can replace the need for an additional set of parked HVAC batteries. In addition, fuel cell APUs (Auxiliary Power Units) allow for parked HVAC cooling, such as during regulated down times for truck drivers (for example during the hours of service (HOS) reset requirement that is currently 34 hours). Current batteries cannot meet the electrical requirements during such an extended down time under typical vehicle operating electrical load conditions.

With one or more fuel cell APUs onboard the vehicle. The fuel cell(s) can then supply the electrical needs for the vehicle.

A fuel cell APU is an auxiliary power unit embodiment that typically runs on hydrogen fuel and can address the limitations of a diesel powered APU. The exhaust from a fuel cell APU can be mainly water vapor and carbon dioxide ($CO_2$), which requires no aftertreatment. Also, a fuel cell APU can be very quiet, vibration free, and/or does not require the same high level of maintenance (e.g., no oil changes).

A fuel cell can create electricity by passing ions across a membrane. There are currently two main types of known fuel cells, namely, a Proton Exchange Membrane (PEM) fuel cell and a Solid Oxide Fuel Cell (SOFC). PEM fuel cells have a fast startup time with relatively low operating temperatures (e.g., 80° C.), but are not as contaminate tolerant, so they can require clean streams of hydrogen as fuel. PEM fuel cells create electricity by passing the hydrogen from an anode side to a cathode side, where it mixes with air to create water vapor.

Solid Oxide fuel cells operate very differently. SOFC fuel cells utilize cell stacks that can typically operate to produce power when in the 800° C. range, so startup times to reach operating temperatures can be much longer (for example, approximately 2 hours). Some SOFCs can be much more contaminant tolerant, so diesel reforming becomes an option. Diesel reforming is the process of vaporizing diesel and breaking it into hydrogen (H) and carbon monoxide (CO) gasses using a catalyst. SOFCs generate electricity by passing oxygen (from air) across the cathode to the anode side. This is different from PEM fuel cells. The H and CO gases are on the anode side, so any remaining fuel not combined with the oxygen can be recycled (along with water vapor) such that no additional water management is required for operation. This can result in increased efficiency compared to a PEM fuel cell. One downside of SOFCs is that the number of on/off cycles can be less than the PEM fuel cell.

Known fuel cells have a number of operating modes, such as Off, Startup, Power and Shutdown Modes. Internal controls within the fuel cell determine when these modes are completed. For example, during the Startup Mode, the fuel cell is heated to bring cell stacks up to their operating temperature, and during the Shutdown Mode, cell stacks are cooled to a temperature where further cooling is not needed to prevent damage to the fuel cell and it can be shut off in the Off Mode. In the Power Mode, the fuel cell is in a condition to provide electrical power at levels ranging from no power (idle) to the maximum capacity of the fuel cell. External control signals delivered to the fuel cell can be used to initiate or interrupt the transition of the fuel cell between selected modes.

An exemplary SOFC APU (using ultra low sulfur diesel as a fuel source) can have an efficiency of approximately 30% when operating in its peak mode. In accordance with this disclosure, the efficiency of a fuel cell APU can be compared with the efficiency of an engine driven alternator when making decisions about using them for electrical power generation in a vehicle. Thus, for example, electrical power generation from a fuel cell operating at 30% efficiency (peak efficiency) is more efficient than electrical power generation from an engine to alternator operation at, for example, 21.6% efficiency as explained above.

In some embodiments of SOFCs, startup electrical load requirements can begin with current draws in the 10 amp range and end with current draws close to 70 Amps. The total startup energy requirement for starting an exemplary SOFC can be about 1.5 kW-hrs over a two hour duration. Conversely, shut down of an SOFC to cool the fuel cell stacks from their operating temperature can require about 1 kW-hr and can take approximately 2 hours as well. In order to maintain a fuel cell at an operating temperature, some fuel usage can be required. For an SOFC fuel cell with a net electrical power output equal to zero, the fuel cell "idle" mode fuel rate can be about 1/10th the idling fuel rate of a heavy duty truck engine. The zero net electrical power output fuel rate is the minimum fuel rate that the fuel cell can have when the fuel cell unit is operating.

FIG. 1 is a schematic illustration of an exemplary power system 10 for a land vehicle such as a truck. In this illustrated embodiment, the power system integrates a fuel cell and energy management system controller with other components to form an efficient electrical network for the vehicle. The illustrated embodiment of a power system 10 comprises an internal combustion engine (IC engine) 12 that receives fuel from a fuel tank 14 via a fuel line 16. In one desirable example, engine 12 is fueled by diesel fuel and can be a truck engine. A starter motor 18 is shown coupled to engine 12 for starting the engine from an engine off state or non-running condition. Power to the starter 18 is delivered via a line 20 from a power distribution module 22. The power distribution module can desirably be a separately identifiable module, but can also be one or more distributed or discrete electrical current routing components that are not grouped together.

An energy storage device 30 in this example delivers power to and receives power from the power distribution module 22 via a line 32. The energy storage device can comprise one or more plural battery containing battery packs or battery stacks, such as a standard truck battery pack in combination with an auxiliary battery pack, a hybrid battery pack and/or an ultra-capacitor pack. These are simply examples of suitable energy storage devices. When the engine is to be started, in one desirable approach, power (cranking current) from the energy storage device 30 is routed through the power distribution module to the starter 18 to start the engine. Sensors, indicated generally at 34 in FIG. 1, are provided to measure attributes of energy storage devices, such as voltage, current and temperature of batteries, to provide an indication of the condition of the batteries. These measured conditions represent the state of charge of the batteries in the battery pack and thus indicate the available current (and thus available power) from the batteries. Thus the phrase state of charge includes signals that indirectly or directly indicate state of charge, such as voltage measurements, current measurements, and/or power measurements. Signals from the sensors 34 indicative of battery condition are transmitted via a line 40 such as to a data bus 42 for transmission via a line 44 to a system controller (energy management controller) 60 indicated in FIG. 1. A data bus 42 is conventional in land vehicles such as trucks and can be used to route various sensor and other signals between components of a vehicle. The signals on line 40 are conditioned to be at the appropriate levels for delivering data over the data bus.

The energy storage device 30 also desirably provides power, via line 32 and the power distribution module to a line 66 and to a fuel cell unit 70. This power can be used, for example, by the fuel cell to run electrical fans contained in the fuel cell to cool the fuel cell during a Shutdown Mode in the case of an exemplary fuel cell of the type requiring very high temperature to operate, such as an SOFC fuel cell. As explained below, power generated by the fuel cell in a fuel cell Power Mode is also transmitted via line 66 to the power distribution module and to the energy storage device 30 for use in recharging the energy storage device. Power from the fuel cell in the Power Mode can also be routed via electrical circuits represented by line 76 to power various vehicle electrical loads 80 of the vehicle. These electrical loads typically include loads commonly referred to as hotel loads, and include various electrical system components operated on the vehicle, such as microwaves, stereos, computer power outlets, heating ventilation and air conditioning units for the cab of the vehicle and/or a trailer, and trailer refrigeration and freezer units. Electricity required to operate the engine and primary truck components (such as dash controls, brake systems, fuel pumps, etc.), are included in electrical loads, but are not considered to be hotel loads.

As also can be seen in FIG. 1, power (current) from the energy storage device 30 can be routed via the power distribution module and a line 82 to the vehicle electrical loads 80 in the event the fuel cell 70 is not in its Power Mode or in the event additional power is required.

The system of FIG. 1 comprises an APU in the form of one or more fuel cells. Any suitable fuel cell can be used such as previously described. However, a particularly advantageous form of fuel cell is an SOFC fuel cell having sufficient capacity to meet the typical electrical requirements of the vehicle, such as a truck. More specifically, a diesel powered SOFC fuel cell is particularly desirable so that it can be fueled using, by reforming, the same fuel as the vehicle, in the case of a vehicle with diesel fueled internal combustion engine. As a result, the fuel cell ties into the diesel fuel system of a diesel fueled truck or other vehicle and the existing fueling infrastructure of the vehicle to support refueling (e.g., fuel tank). For example, in FIG. 1, fuel for an SOFC fuel cell can be provided from the fuel tank 14 via a line 90 to a fuel reformer 92 (that can be separate from or a part of the fuel cell). The fuel reformer provides the desired fuel for the fuel cell.

As is apparent from FIG. 1, and as previously mentioned, the fuel cell 70 can provide electrical power via the line 76 to supply power to the vehicle electrical loads 80. In the event the electrical loads are utilizing less than the total power being generated by the fuel cell, the fuel cell output can then be used to recharge the energy storage device via the line 66, the power distribution module 22, and a line 32. Alternatively, power (current) from the fuel cell can be routed entirely to the energy storage device and then re-routed to the electrical loads as needed.

Although various modes of operation can be achieved by a fuel cell, in one form an SOFC fuel cell can be operated in the following exemplary states or modes:

Startup Mode—diesel combustion is initiated to heat up the fuel cell stack. During this mode, the fuel cell is consuming fuel and is typically not producing any net electrical output.

Power Mode—this is the normal operation mode of the fuel cell and typically follows the Startup Mode. The fuel cell is generating electrical power such as to run the electrical loads 80, which can include hotel loads, and for battery charging, as examples. If the fuel cell is in the Power Mode but producing a zero power output, in effect the fuel cell is in an Idle Mode.

Shutdown Mode—during fuel cell shut down, such as initiated by a driver command and/or by the system controller 60, electrical fans or other cooling mechanisms directed toward the fuel cell can be turned on to cool down the fuel cell stack. If fans are on, the fuel cell is consuming electrical power in this Shutdown Mode.

Off Mode—in this mode the fuel cell is off, which desirably follows the Shutdown Mode after the stacks have been sufficiently cooled down, such as in the case of an SOFC fuel cell, to a desirable low temperature level where the fuel cell would not be damaged if the cooling mechanisms are turned off. The Off Mode can be the state of the fuel cell before the Startup Mode.

The system of FIG. 1 is also shown with an alternator 100 coupled to the internal combustion engine, such as by a belt coupled to the engine crankshaft. The alternator 100 can be an alternator of the type that is continuously operated (driven) by the engine when the engine is running with power from the alternator being provided along a line 102 to the power distribution module 22. This power can be used to supply the vehicle electrical loads and/or to charge the energy storage device. In a desirable alternative, the alternator 100 can comprise an alternator that is selectively driven by the engine via the engine crankshaft to produce electrical power (current). Thus, the alternator can comprise a switchable power output alternator that is operable in response to an alternator control signal to shift from a first power mode in which the alternator is driven by the engine to produce output power at an alternator output and a second non-power mode in which the alternator is not driven by the engine to produce output power. One specific form of a switchable power output alternator is a clutched alternator that can be clutched and/or declutched from being driven by the engine 12, such as in response to an alternator clutching/de-clutching control signal from system controller 60 delivered via a line 104 to a control input of the clutched alternator. The system controller can selectively provide an engine start signal to cause the engine to start, the system controller selectively controlling the shifting of the alternator to the first power mode and the starting of the engine so as to control the production of alternator output current, the fuel cell being operable to produce electrical power when the fuel cell is in a Power Mode. The signals on line 104 can be transmitted via the data bus 42.

In the case of a clutched alternator, the alternator produces electrical current when the alternator is clutched to be driven by the engine crankshaft, for example, which can then be used to power the electrical loads and/or to recharge the energy storage device as previously described. In one specific implementation, an electromechanical clutched alternator can be used that stops rotating when declutched.

Figure 5:
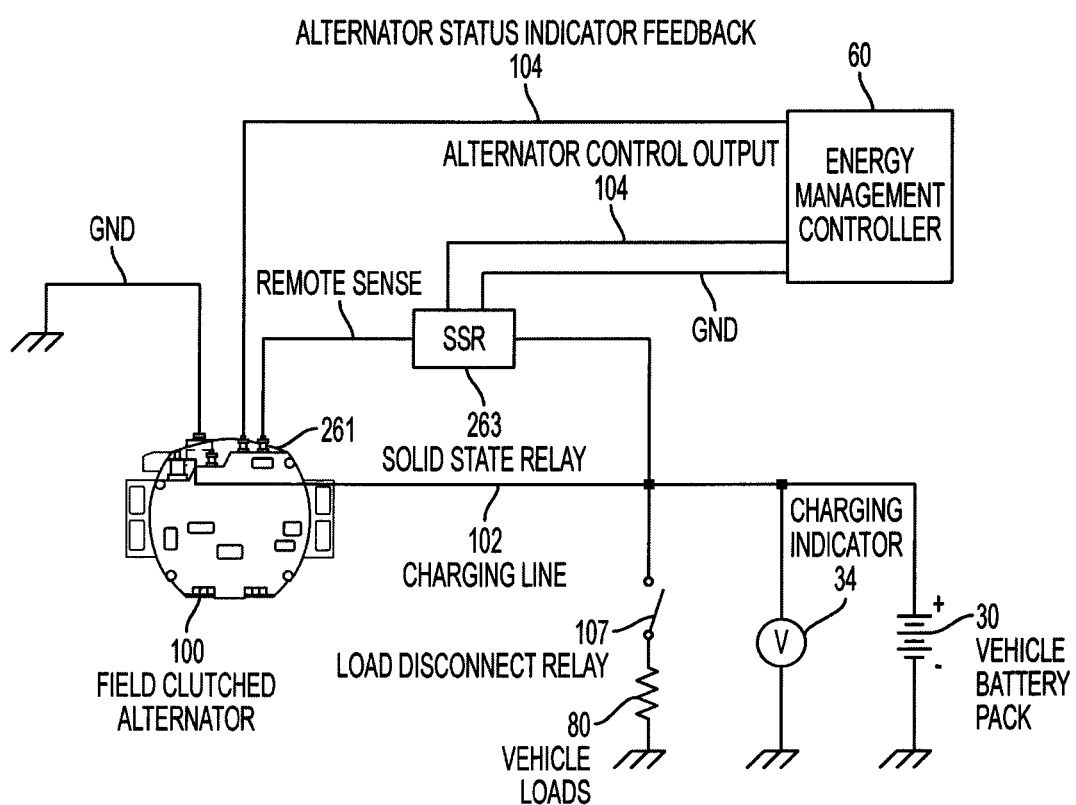
FIG. 5 is a schematic illustration of a portion of a power system with an exemplary form of a clutched alternator

As another implementation, a field clutched alternator can be used that allows the alternator field to be switched on and off in response to clutching and de-clutching signals from the system controller, to control the alternator power delivery. A clutch position sensor (on/off sensor), an alternator speed sensor, and/or an alternator fuel sensor can be instrumented with output signals coupled via the data bus to the system controller 60 for feedback to the system controller to indicate whether the alternator is in the clutched or de-clutched state (see feedback line 104 in FIG. 5). In one specific example, if the charge on the energy storage device drops below and/or reaches a low charge or low threshold level, the alternator can be clutched to engage the engine, with the engine being started if not already running. For example, if sensors 34 coupled to the energy storage device determine that the available charge in the energy storage device is low enough such that continued drain may jeopardize the ability of the energy storage device to start the engine 12 via the starter 18, the engine can be started and the alternator clutched on to again charge the energy storage device.

The system controller can optimally manage the electrical network by controlling the alternator clutch, if a clutched alternator is included and the fuel cell mode (e.g., startup, power and shutdown of the fuel cell).

The system controller 60 can also provide control signals via a line 106 to the power distribution module. The system controller can comprise a microprocessor with memory and suitable output conditioning or driver circuits for providing output signals at desired levels. Existing vehicle control modules can be used if they have available capacity. The controller can be a discrete control module or can comprise distributed computing components. These additional control signals can, for example, comprise an optional automatic engine start (AES) signal. In response to the AES signal, the power distribution module couples energy to the starter for the energy storage device and/or from the fuel cell if in the Power Mode to the starter 18 to start the engine. The automatic engine start signal can be generated, for example, in response to charge on the energy storage device dropping below and/or reaching a threshold level.

Another exemplary control signal from system controller 60 via line 106 can be an optional disconnect hotel loads signal that, when delivered to the power distribution module, causes the power distribution module to turn off the power to selected vehicle electrical loads, such as in a priority load shedding manner. For example, one or more load disconnect relays, one being numbered as 107 in FIG. 5, responsive to signals from system controller 60 or from the power distribution module in response to signals from the system controller can be operated to selectively disconnect and connect electrical loads, such as hotel loads. For example, a vehicle heating ventilation and air conditioning system can be turned off while maintaining lights on in the interior of a vehicle cab as the lights are a higher priority electrical energy use. These loads are typically shed to minimize the risk of the charge on the electrical storage device dropping below a level required to turn on the engine and to safely cool the fuel cell, in the case of a fuel cell of the type requiring such cooling. Again, the signals on line 106, like the signals on line 104, can be delivered via the vehicle data bus 42.

The power distribution module (PDM) 22 can comprise a junction block that interfaces the electrical loads, energy producing devices (e.g., alternator and fuel cell in a Power Mode) and energy storage devices on the vehicle. The power distribution module can provide routing for delivering power from the energy storage device to the starter to start the engine in response to an auto engine start command via line 106 and/or in response to the ignition key being turned on by a driver or other vehicle operator.

Figure 2:
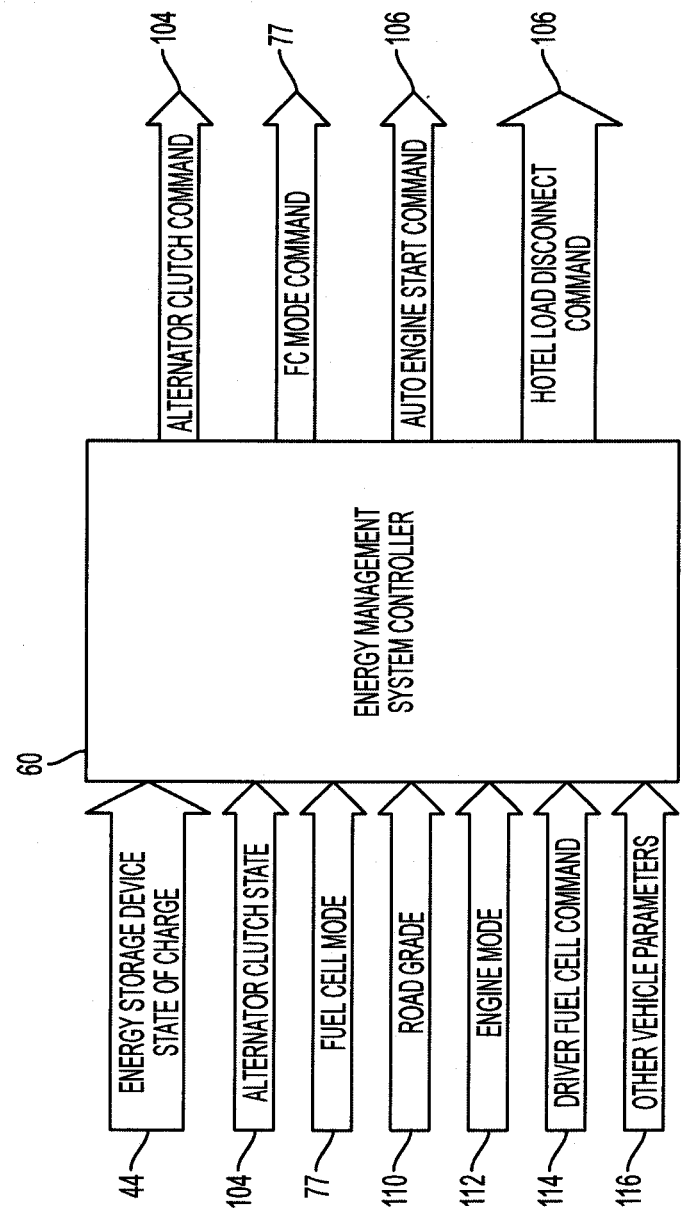
FIG. 2 is a schematic illustration of an exemplary energy management system controller that can be used in the embodiment of FIG. 1.

The system controller 60 can optimally manage the electrical network by, for example, controlling the alternator clutch in embodiments where a clutched alternator is used and also controlling the initiation of fuel cell mode transitions and thereby the mode of the fuel cell 70 at least between selected modes. FIG. 2 illustrates the exemplary inputs and outputs of one embodiment of a system controller 60. The system controller desirably comprises a processor and memory program to carry out its functions. Programming can be carried out, for example, by using a data entry device such as a keypad, touchpad or other data enterer.

A fuel cell mode can be indicated to the system controller by, for example, a fuel cell mode signal delivered via line 76 to the system controller. Again, these signals can be delivered via the bus 42. The illustrated embodiment of the system controller 60 can use one or more inputs, such as comprising the inputs identified by the following examples.

Energy storage device state of charge (SOC) is one signal that can be provided. The state of charge is a signal that indicates the available electrical energy (current) from the energy storage device, such as from one of the sensors 34 of FIG. 1 provided on line 40 via the database 42 to the input 44 to the system controller. The state of charge signal can be estimated or determined from one or more sensor variables that directly or indirectly indicate the charge condition of the energy storage device. For example, the state of charge can be determined from voltage, current and temperature signals from a battery pack. This information can be used by the system controller to, for example, ensure that there is sufficient energy available in energy storage devices (e.g., a battery pack) for a guaranteed proper engine start even after a long idle period and even under adverse environmental conditions (such as extremely cold weather). An alternator clutch state signal is shown being provided to energy management system controller 60 via the line 104 in FIG. 2. This signal can be eliminated in the case of a non-clutched alternator that remains continually driven by the engine. The alternator clutch state signal indicates whether the alternator is in a power mode or in a non-power mode. Alternatively, the energy manager system controller 60 can determine the alternator clutch state in alternative ways, such as from the last command provided by the energy management system controller to the clutch and/or by monitoring the alternator output current.

Another signal provided to the controller 60 in the FIG. 2 embodiment can be a fuel cell mode signal delivered via line 77 from the fuel cell 70 (and more typically via the system bus 42) to provide an indication to the system controller of the current operational mode of the fuel cell. An optional road grade signal 110 is provided to system controller 60 to provide an indication to the controller of the grade of the road along which the vehicle is traveling. The road grade information can be the instantaneous road grade, such as determined from a road grade sensor or based on a mathematical estimation. Alternatively, the road grade can be determined from GPS signals indicating the location of the vehicle and a map database which stores road grade as an attribute. A predictive road grade signal can alternatively be provided to indicate the road grade of an upcoming section of the road along which the vehicle is to travel. The road grade provides an indication of power demands expected to be placed on an engine. For example, if the vehicle is traveling up a steep slope or a steep slope is anticipated, the fuel cell can be placed in a Power Mode to provide power to the electrical loads with the alternator being declutched to reduce demand by the alternator on the engine, thereby making more power available to drive the vehicle up the slope.

An engine mode signal 112 can also be provided to the system controller 60, such as via the data bus 42. The engine mode can indicate whether the engine is off, cranking, shifting, idling or in a normal non-idling running mode. Desirably information on whether the engine is running or off is at least delivered to the system controller so that the system controller can turn on the engine 12 to charge the energy storage device 30 when the energy storage device state of charge drops to an undesirable low level. Various alternative approaches can be used to determine the engine mode. For example, engine speed can be used to determine the mode. Engine speed can be calculated based on a signal from a speed sensor or from other data available on the data bus.

In the illustrated exemplary embodiment, an optional fuel cell command signal 114 is also provided to the system controller, such as a vehicle driver or operator initiated command signal. In one form of controller, the controller is responsive to a driver initiated on/off signal to provide a control signal to the fuel cell to either turn on the fuel cell portion of the system to allow the fuel cell to operate or to turn off the fuel cell portion of the system to allow the fuel cell to shift to a Shutdown Mode and to an Off Mode. A signal on line 114 allows the system controller 60, in response to this signal, to determine a vehicle operator's intention to start/shutdown the fuel cell. The fuel cell control strategy, such as described below, can then operate in response to this signal.

Other vehicle parameter indicating signals 116 can also be provided to the energy management system controller 60, such as via the data bus 42. These signals can, for example, be determined by additional sensors on the vehicle electrical network such as to provide an indication of the power requirements of additional vehicle loads. For example, whether a primary engine fan is turned on or the temperature is increasing such that the engine fan is likely to be turned on resulting in additional power drain and/or the condition of the vehicle HVAC system, air temperature that provides an indication of demand on a trailer freezer/refrigeration unit or whether the temperature is cold so that more charge will be required to start the engine, and other such signals. The energy management system controller 60 can control the power system to achieve a number of respective alternate and/or alternative goals such as the maximization of overall efficiency; reduction of the number of fuel cell shutdown/startup operations in order to improve reliability of the fuel cell; monitoring the state of charge on batteries of the energy storage devices to improve battery life, such as by not allowing the state of charge to drop too low; and maintaining sufficient stored energy in the energy storage devices for a guaranteed proper engine start even after a long engine shutdown or idle period.

The energy management system controller 60 desirably provides a number of outputs based on, for example, the then current electrical loads and vehicle operating conditions. These outputs can comprise the outputs represented in FIG. 2. One such output is an alternator clutch command output that can be delivered on line 104 to a clutched alternator 100 (see FIG. 1) to cause the clutched alternator to shift to the desired state (e.g., power mode or non-power mode). If the alternator 100 is of the type that remains driven by the engine crankshaft at all times, the alternator clutch command can be eliminated. Another exemplary command from the energy management system controller 60 is a fuel cell mode command delivered via line 77 to the fuel cell 70 (FIG. 1). This signal indicates to the fuel cell the mode to which it is to shift (for example from Off Mode to Startup Mode). In response to these signals, the fuel cell can initiate the shift to the desired mode, typically following the procedures controlled internally by the fuel cell (e.g., initiating heating the fuel cell stacks if the control signal indicates a shift to the Startup Mode from the Off Mode).

An additional signal is an auto engine start command that can be delivered via line 106 to the power distribution module to cause the delivery of energy from the energy storage device to the starter 18 of the engine to cause the engine to start up. This is an optional feature that can be included to allow the system controller to automatically start the engine under certain conditions, such as when the stored energy (e.g., the battery state of charge) reaches a minimum threshold. As an option, this feature can be selectively disabled or enabled, such as by a command from the vehicle operator. If the auto engine start (AES) feature is enabled, the system controller can command an automatic engine start based on the state of the battery charge (for example as indicated by available current from the energy storage device).

Another output signal represented in FIG. 2 is a hotel load disconnect command delivered via line 106 to the power distribution module resulting in the power distribution module disconnecting all or some of the hotel loads. This feature, if included, can be used to allow the system controller to control the disconnecting of selected or designated electrical loads to prevent the discharge from energy storage devices dropping below a state of charge threshold, for example.

The driver fuel cell command 114 input to the system controller 60, if used, can be responsive to, for example, the output or position of a physical switch. A switch state signal can be provided to the system controller, such as via the system bus, with the system controller then making a determination as to whether the request should be immediately allowed or allowed following the progression of the fuel cell through a number of fuel cell modes (such as from the Power Mode to the Shutdown Mode to the Off Mode). Alternatively, in an automatic system or remotely controlled system, the capability of the driver to turn off or on the fuel cell portion of the system can be eliminated.

Figure 3:
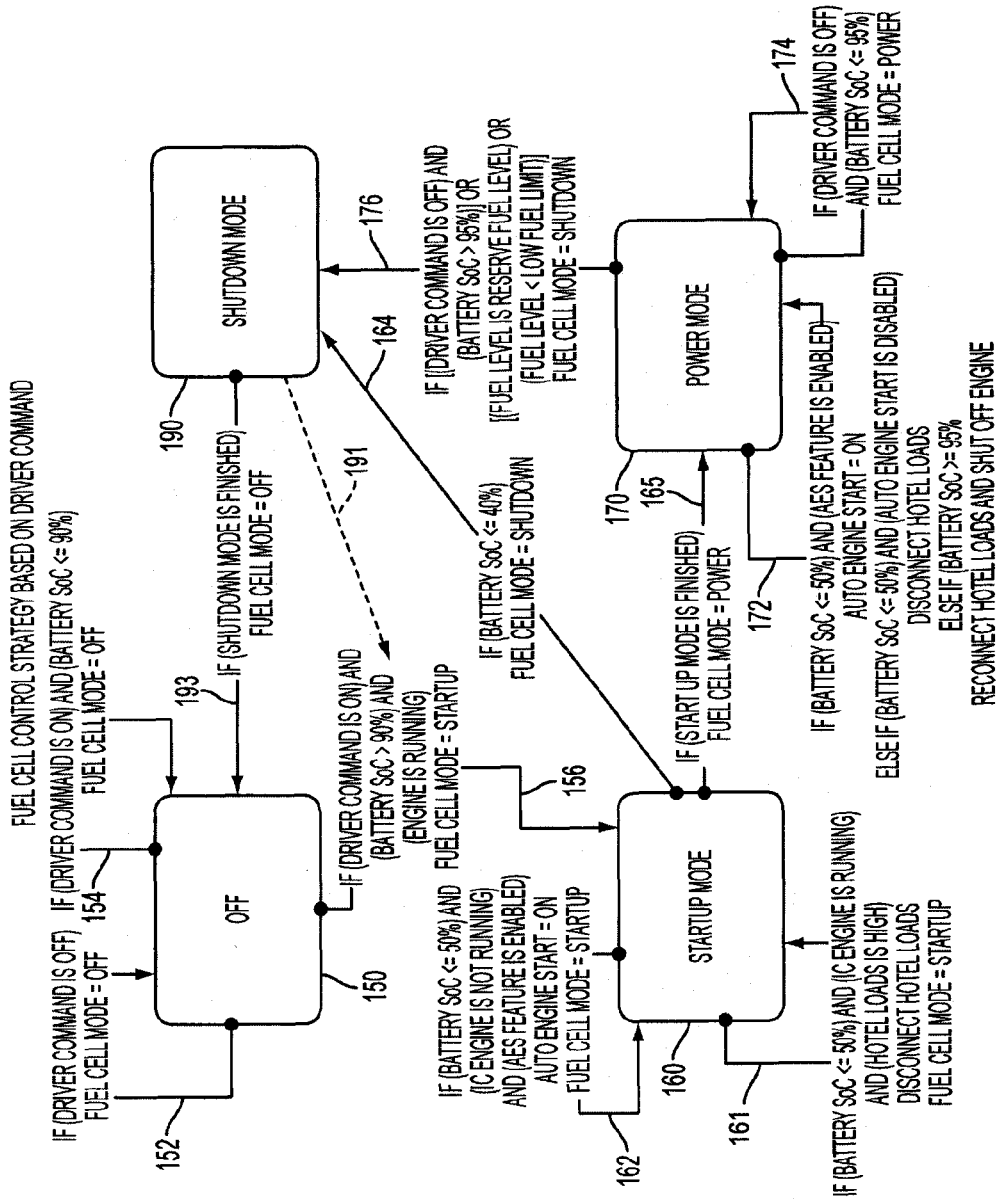
FIG. 3 is a schematic illustration of an exemplary control strategy that allows for driver command inputs.

FIG. 3 illustrates an exemplary system control strategy that can be implemented by control signals from the system controller 60 to the fuel cell with the driver control option in place. In the example of FIG. 3, the fuel cell modes are indicated respectively as follows: an Off Mode by a block 150; a Startup Mode by block 160; a Power Mode by block 170; and a Shutdown Mode by block 190. The fuel cell can shift from one mode to another or remain in a mode in response to control signals from the system controller 60 based on one or more conditions such as vehicle operating conditions (e.g., whether the engine is running, the battery state of charge, the status of an on/off control command, whether an automatic engine feature is present and enabled, the fuel level, and whether a particular mode has finished) and environmental conditions (such as the road grade). Also, in response to these conditions, electrical loads, such as hotel loads, can be selectively disconnected or reconnected to control the delivery of power (current) to these loads.

In this disclosure, if power is being delivered, current is also being delivered.

Although examples of battery state of charge levels are described with reference to as thresholds, it should be understood that these thresholds can be varied, for example based on ambient temperature (where more power is required to start an engine from a cold start under cold ambient temperature conditions, but less power is required to cool a fuel cell under cold ambient conditions). In addition, the thresholds can be varied based on the characteristics of the energy storage device. Thus, if it is required that the energy storage device has enough power to start the engine under worst case scenarios (e.g., cold engine under extremely cold ambient conditions), but the energy storage device comprises multiple battery packs, the threshold can be at a lower level than if only a single battery stack is included in the vehicle. Also, the number of batteries in the battery pack and the type of batteries can also affect the threshold levels. The term threshold is to be broadly construed. Thus, if an action is to be taken when a threshold is reached, accomplishing this action at a level that varies with conditions meets this requirement. Also, the term less than a threshold is met by an action taking place at a level equal to a first level as in this case the threshold can be construed to mean the level immediately above the first level where the action took place and thus the action took place at a level that is less than a threshold. Similarly, the term greater than a threshold is met by an action taking place at a level equal to a threshold as in this case the threshold can be construed to mean the level immediately below the level at which the action took place.

In the example of FIG. 3, assume for purposes of discussion that the system is currently off and thus the description starts at block 150 corresponding to the Off Mode. It should of course be noted that that the description can start with any one of the modes depending upon the mode at which the fuel cell is in. Assume that the illustrated embodiment is responsive to a driver fuel cell command signal 114. If the driver command is Off, as indicated by logic loop 152, the fuel cell mode remains in the Off Mode or state. Also, assume the driver command is On, but the battery state of charge of one or more batteries of the energy storage device 30 (FIG. 1) is in a less than full charge state, a logic loop 154 is followed and the fuel cell remains in its Off Mode. The less than full charge battery state can correspond to the charge being less than or equal to a first threshold charge state. Under these conditions and in this example, priority is being given to charging the batteries by not allowing fuel cell to start up until the battery charge exceeds this first threshold. This first threshold can be set to be at a level that would be sufficient to both provide power to move the fuel cell through the Startup Mode to the Power Mode and also leave sufficient power to provide an engine start for the engine. Alternatively, the first threshold can be at a level that insures that a functioning vehicle can be started under worst case environmental conditions. Although it can be varied, the first threshold, for example, can be less than or equal to 90% of full battery charge in one specific example.

Assume from block 150 the driver command is On and the battery state of charge is greater than the first threshold. In this case a logic path 156 can be followed with the fuel cell mode being shifted to the Startup Mode at block 160. However, as an option, the specific exemplary path 156 shown in FIG. 3 also requires the engine to be running for the path 156 to be followed to the Startup Mode. Consequently, power from the engine alternator, if engaged and being driven by the engine, is available for fuel cell start up and to provide power to electrical loads during the startup process of this fuel cell.

If during the Startup Mode the battery state of charge drops to or below a fourth threshold lower than the first threshold, such as less than or equal to 50% of the full charge, but greater than a second threshold, such as 40% of full battery charge, and the internal combustion engine is not running, but the system is equipped with an automatic engine start feature that is enabled, the internal combustion engine is started and the fuel cell mode remains in the Startup Mode. These conditions are indicated by the logic loop 162 from block 160. The logic loop 162 allows a fuel cell to remain in the Startup Mode if the driver shuts off the engine before the fuel cell Startup Mode has been completed. If this were to occur, the fuel cell would be in a Startup Mode with the engine not running. This logic loop allows the fuel cell to remain in the Startup Mode, with the engine off, until the battery state of charge reaches the second threshold. If the fuel cell Startup Mode has not been completed before the fourth threshold is reached, and the AES feature is enabled, the AES will start the engine to allow the fuel cell Startup Mode to continue with the engine being operated and the alternator being driven by the engine (e.g., clutched in the case of a clutched alternator) to provide power to the energy storage device. If on the other hand the AES feature is not enabled and the battery state of charge reaches the fourth threshold before the fuel cell Startup Mode has been completed, the fuel cell nevertheless can continue to operate in the Startup Mode in this example until the Startup Mode has been completed or until the battery state of charge reaches the second threshold, and the fuel cell would be switched from the Startup Mode to the Shutdown Mode in this example. The range between the fourth and second thresholds provides a small buffer to allow for continuous operation of the fuel cell in the Startup Mode before switching to the Shutdown Mode. This would allow the Startup Mode to be completed in cases where the Startup cycle has nearly been completed when the state of charge of the energy storage devices reaches the fourth threshold. In addition, if the fuel cell is in the Startup Mode, the battery state of charge is less than a third threshold, and the internal combustion engine is running, but the hotel loads are high (for example current being demanded by the electrical loads exceeds a high load threshold), selected hotel loads can be disconnected (such as by sending one or more control signals via the line 106, FIG. 2) to the power distribution module 22 (FIG. 1) to cause the disconnect of some of the electrical loads 80. Under these conditions, which are indicated by logic loop 161 in this example, the fuel cell remains in the Startup Mode. Although not required, desirably the third and fourth threshold levels or values can be the same.

In contrast, if the fuel cell is in the Startup Mode and the battery state of charge drops to or below the second threshold, such as 40% of the full charge, the fuel cell is shifted to the Shutdown Mode, as indicated by logic pathway 164 from block 160. In this case the shutdown procedures associated with the Shutdown Mode and block 190 as discussed below can be followed.

Assume the Startup Mode at block 160 is completed, which is the more normal of the options. In this case the logic path 165 is followed to the block 170 and the fuel cell is shifted to the Power Mode with the fuel cell being available to produce power (current) for electrical loads and/or to charge the energy storage device. When in the Power Mode, assume the battery state of charge reaches a sixth threshold (see logic loop 172), which can be equal to the third and fourth thresholds, such as less than or equal to 50% of the full battery state of charge. As an alternative in logic loop 172, if the battery state of charge is less than or equal to the sixth threshold and an automatic engine start feature is enabled, the engine can be started and the alternator clutched (if a clutched alternator is used), so that the alternator provides power to the electrical loads and/or to the electrical energy device to charge such device. As another alternative, if the sixth threshold is reached and the engine is not started, selected vehicle electrical loads, such as hotel loads can be disconnected. This is also indicated by logic loop 172.

On the other hand, if the battery state of charge rises (for example due to charging of the batteries by the fuel cell or otherwise, for example if the alternator is switched on or to a power mode for a period of time) to a high threshold, these hotel loads can be reconnected. For example, the high state of charge can be a seventh threshold such as at 95% of the full state of charge, or some other threshold such as the first threshold. This is also indicated as an alternative in the logic loop 172. In addition, the engine can be shut off in this latter example, if the vehicle is not traveling. If the fuel cell is in the Power Mode and the driver initiates an off command, but the battery state of charge is less than a fifth threshold or desired level, for example insufficient charge remains to power fans to fully cool the fuel cell while leaving enough battery charge to start the engine, the fuel cell can remain in the fuel cell Power Mode as indicated by logic loop 174. For example, logic loop 174 can be followed if the battery state of charge is less than or equal to a fifth threshold, such as 95% of full charge. In this example, the fifth threshold is greater than the first threshold to provide an added safety margin that the system fuel cell can be successfully shut down (cooled to a desired level) with enough charge remaining to start the vehicle.

From block 170, if the driver has entered an off command and the battery state of charge is greater than the fifth threshold, such as equal to 100% of full charge or an eighth threshold, a logic pathway 176 is followed and the fuel cell shifts from the Power Mode to the Shutdown Mode 190. By placing the eighth threshold at a level that is higher than the fifth threshold, an additional safety factor is included in that additional charge remains to shut down the fuel cell while leaving enough charge remaining to start the vehicle. Logic pathway 176 also can include some alternative logic. For example, logic path 176 can be followed regardless of the driver command if the fuel level is at a reserve fuel level or is less than a low fuel limit. The level of fuel can be monitored in the fuel tank (with fuel level signals being sent to the system controller, from fuel sensors, such as via the data bus) with the system being shifted from a Power Mode to a Shutdown Mode to conserve fuel to provide enough fuel for the engine to start and for the vehicle to be driven a minimum distance. This minimizes the risk of the fuel cell continuing to use fuel until the fuel runs out in the vehicle, leaving insufficient fuel for the vehicle to travel to a fueling location and for completion of the Shutdown Mode.

When in the Shutdown Mode at block 190, fans and/or other cooling devices are operated to cool the cells of the fuel cell (e.g., such as in the case of an SOFC fuel cell) to a sufficient level where the cooling mechanisms for the fuel cell can be turned off without damaging the fuel cell. The logic pathway 193 can then be followed from the Shutdown Mode block 190 to the Off Mode block 150. In one exemplary embodiment depicted in FIG. 3, the Shutdown Mode can be required to be completed before the fuel cell can be restarted. In an alternative embodiment, the fuel cell can move from the Shutdown Mode to the Startup Mode (such as indicated by logic path 191) if the conditions for the Startup Mode are met (e.g., the logic conditions of pathway 156 are met). Also, the fuel level condition shown in pathway 176 can be included in logic paths 156 and 165 as well as in other logic pathways to result in the fuel cell being shifted to or toward the Off Mode in the event the fuel level drops to a level deemed too low to continue.

Thus, the system controller can also automatically shut down the fuel cell if the vehicle's fuel level reaches a specified reserve or absolute low fuel level limit. The automatic shutdown strategy thus can ensure that the fuel cell has enough fuel to shutdown properly and also prevents the fuel cell from completely depleting the vehicle fuel supply. Sufficient fuel should desirably remain after shutdown of the fuel cell to permit an engine start and to allow the vehicle to reach a refueling point. In addition, a reserve fuel level can be defined that represents the amount of fuel required for the vehicle to travel a specified number of miles, at a current and/or predetermined fuel consumption rate, as well as the fuel required for proper fuel cell shutdown. In contrast to an absolute low fuel level limit, the reserve fuel limit value can be relative and can vary based on actual vehicle operating conditions.

As previously mentioned, the exemplary state of charge thresholds shown in FIG. 3 can be a function of ambient temperature. For example, the threshold percentages can be varied with ambient temperature with the thresholds being higher to allow for a higher state of charge of the battery for a safe engine start in extremely cold weather. The threshold percentages shown are suggested values. The actual values can differ based on vehicle specifications, engine starting requirements, and capacity of the energy storage device (e.g., number of batteries contained in starting battery pack, capacity rating, device type, etc.). The threshold values (e.g., the first threshold) desirably are established such that battery state of charge is desirably at least sufficient for a successful engine start under adverse conditions.

It should be noted that, in the case of some fuel cells, a procedure for moving from the Shutdown Mode to the Startup Mode without passing through the Off Mode can be used. In addition, the thresholds can be varied in the case of fuel cells that do not require as much cooling to shut them down. As another option, logic can require the fuel cell to be started only if the internal combustion engine is running in the normal mode and power is being provided from the alternator to the energy storage device. For example, the alternator can be of the type that is continuously connected to the engine. Alternatively, the alternator can be a clutched alternator that is in its clutched or power mode position to charge the energy storage device and also to provide power to start the fuel cell in the Startup Mode.

Figure 4:
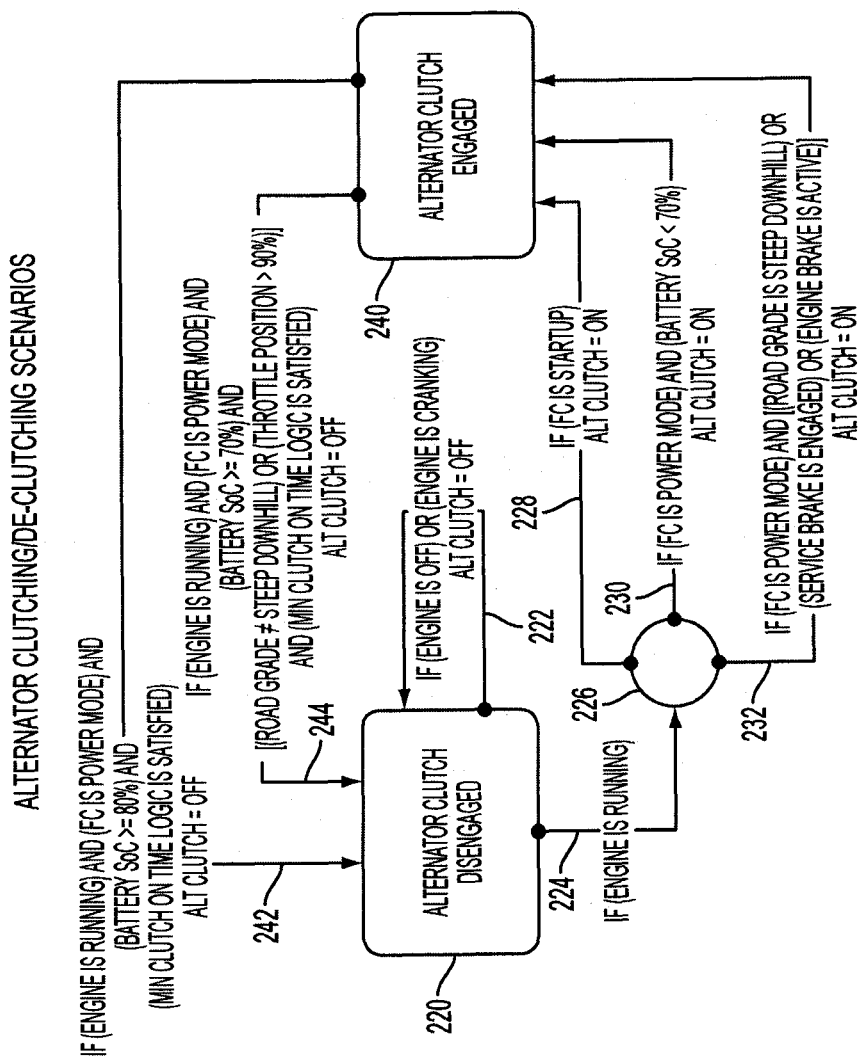
FIG. 4 is a schematic illustration of exemplary alternator clutching/de-clutching scenarios or embodiments with a clutched alternator.

Many engine auxiliaries, including the alternator when in a power mode, consume torque from the engine crankshaft during operation. When the vehicle travels on a steep uphill section (e.g., an uphill grade of three percent), it can be fuel efficient to reduce the auxiliary torque losses (e.g. by using a clutched alternator and disengaging the alternator) to allow the engine to operate in a fuel efficient portion of an engine fuel map. Conversely, when the vehicle traverses a steep downhill section of the road (e.g., a downhill grade of three percent or more), by engaging the alternator, the clutching of the alternator can provide benefits such as adding more braking and not making any fuel demands (or substantially reduced demands). The Schematic diagram in FIG. 4 shows an exemplary strategy for clutching and de-clutching an alternator based on the road grade, fuel cell mode and battery state of charge. On a steep downhill slope, the system in an alternative can refrain from engaging the alternator unless a determination is made that the downhill will continue for a length of time (such as thirty to sixty seconds or more) and/or minimum distance (such as one-half to one mile).

When the clutch is engaged, the alternator speed can be a function of the engine speed. In one embodiment, an electromagnetic clutch operates in response to control signals from the system controller 60 (FIG. 1), such as in response to a twelve volt signal. The system controller 60 can supply the control signal to the clutch for shifting to the power mode for a period of time, such as one second. After this time period, the system controller can supply a maintain state signal, such as an eight volt signal to the clutch to hold the clutch in the power mode position. The variation in voltage can be realized by, for example, a pulse width modulated (PWM) command with a varying duty cycle as determined by the system controller. Other alternative command clutching and de-clutching strategies and controls can be used.

In order to prevent chatter of alternator clutch due to frequent engagement and disengagement, the system controller can implement a minimum ON time logic. For example, the system controller can hold the clutch in a power on mode or state for a minimum time, such as ten seconds for example, once the clutch is in this mode. In this example, until the clutch is in the power mode for this minimum time, it cannot be switched to the non-power mode. This feature can improve the lifetime of the clutch.

Road grades can be determined instantaneously, based on, for example, a slope detector, a slope estimator, or otherwise. Alternatively, road grades can be determined instantaneously or predicatively, such as from a map database containing road segment slope attributes, and with information on the route to be traveled by the vehicle and the current vehicle position (e.g., from GPS signals received by a GPS receiver on the vehicle). With this information, for example, knowing that a steep down slope is soon to arrive, the controller can allow the state of charge to drop below an otherwise established threshold rather than engaging the alternator, and then engage the alternator when the downhill segment is reached. Conversely, knowing that an uphill segment being approached, the controller can engage the clutched alternator to store additional charge even though the stored charge is above a threshold and then disengage the alternator to reduce the load from the alternator during at least a portion of the time the vehicle is traveling up the slope. Thus, predictive alternator engagement and disengagement can be used whether a fuel cell or other APU is being employed.

In another embodiment, a field clutched alternator 100 (see FIG. 5) can be used that allows the alternator field to be switched ON and OFF. When the alternator field is OFF, the alternator is in a non-power mode and does not provide output power. In contrast, when the alternator field is ON, the alternator is in a power mode and provides output power. The alternator field can be switched OFF and ON by opening and closing an external sense connection 261 (FIG. 5) of the alternator. In one specific implementation the energy management system controller is connected to a relay 263, which is used to provide signals to control the ON/OFF state of the alternator.

In one specific implementation of the energy management control strategy, there are four exemplary states of operation of the fuel cell and field clutched alternator. These four exemplary states are as follows: 1. Fuel cell is in the Power Mode and providing power and the alternator is in a non-power mode; 2. Fuel cell is in the Power Mode not producing power and the alternator is in a power mode to produce power; 3. Fuel cell is in the Off Mode not producing power and the alternator is in a power mode to produce power; and 4. Fuel cell is in the Power Mode to produce power and the alternator is in a power mode to produce power, for example, in cases where the output power capacity of the fuel cell is exceeded by vehicle electrical loads and additional electrical power is required.

In this embodiment, one portion of a clutched alternator control can be a switching strategy that is used to determine whether option 1 (fuel cell in Power Mode and alternator in non-power mode) or option 2 (fuel cell in non-power production mode and alternator in power mode) is more efficient in terms of fuel consumption. The switching strategy logic can be, for example, activated only when the engine is running and the fuel cell is ON (e.g., the fuel cell is in the Power Mode). When activated, the switching strategy can monitor other vehicle parameters and use them to compare fuel efficiency of using the fuel cell to power the electrical loads on the system and the alternator to power the electrical loads on the system. The energy storage device state of charge can also be a factor, for example, with the alternator being used to provide power if the state of charge drops below a threshold. Thus, in this embodiment, a vehicle power system controller coupled to the alternator and to the fuel cell can be operable to control the production and distribution of electrical energy in the vehicle power system, the controller being configured to, based upon the electrical energy consumption of the electrical loads and the state of charge of the energy storage device, shift the alternator between the first power mode and the second non-power mode and to shift the fuel cell between the plural fuel cell modes. Also in accordance with another aspect of an embodiment, the vehicle power system controller can selectively control the production of energy from the fuel cell and from the alternator to be solely from the fuel cell under conditions wherein the state of charge of the energy storage device is at or above a threshold, wherein the fuel cell is in the Power Mode and has the capacity to supply the electrical energy requirements of all of the electrical loads that are drawing energy from the power system (e.g., all of the electrical loads that are drawing electrical current from the system), and wherein it is more efficient to provide electrical energy from the fuel cell than to provide electrical energy from the alternator. As a further alternative, the vehicle power system controller can selectively control the production of energy to be from both the fuel cell and the alternator under conditions wherein the state of charge of the energy storage device is at or above the threshold, the fuel cell is in the Power Mode, but the fuel cell lacks the capacity to meet the electrical energy requirements of all of the loads. As another aspect of an embodiment, the vehicle system controller can selectively control the production of electrical energy to be solely from the alternator under conditions wherein the state of charge of the energy storage device is less than a threshold. The fuel efficiency at the then current vehicle operating conditions can be determined for these two options (1) and (2) using vehicle parameters. Then, the most fuel efficient option can be selected and implemented. Thus, if option 1 is determined to consume less fuel, the alternator can be switched to a non-power mode and the fuel cell operated to provide electrical power on demand. Conversely, if option 2 is determined to consume less fuel, the alternator can be shifted to a power mode and the fuel cell net electrical power output brought to zero. Other vehicle parameters that can be monitored can comprise any one or more of the following parameters:

Load current
Bus voltage
Engine speed (RPM)
Service Brake Status
Engine Brake Status (Retarder Status)
Engine Torque Demand
Engine Fuel Consumption
Vehicle Speed
Accelerator Pedal Position The exemplary use of these parameters will be apparent from the description of FIG. 4 below.

The set point voltage of the fuel cell can be used to control the switching of the fuel cell electrical power output when operating in Power Mode. When the alternator is disengaged, the bus voltage will drop below the fuel cell set point voltage and the fuel cell will automatically respond to meet the current electrical power demand.

Conversely, when the alternator is engaged, the bus voltage will exceed the fuel cell set point voltage and the fuel cell will automatically respond by adjusting net electrical power output to zero. To realize this type of control of the fuel cell electrical power output, the fuel cell set point voltage can be specified to be between the alternator set point voltage and the nominal energy storage device voltage (e.g., battery). For this particular implementation, an explicit fuel cell Power Mode command from the energy management system controller is not required. The electrical power output can be managed internally by the fuel cell system controller 60.

When the fuel cell is operating in standby Power Mode, with zero net electrical power output, it consumes fuel to maintain the temperature of the cell stack and provide power for internal system electrical loads (e.g., cooling fan, power management). This rate of consumption is known as standby or idle fuel consumption. In most cases, when the fuel cell is ON, using the fuel cell to provide electrical power consumes the least amount of fuel and option 1 (fuel cell in Power Mode and alternator in non-power mode) is the most fuel efficient option. This is due to the fact that any fuel consumption reductions that might be achieved from engaging the alternator would need to offset the standby fuel consumption of the fuel cell.

Alternator efficiency and fuel cell efficiency maps can be used by the energy management system controller to compute the fuel consumption of each option in real time and determine which is the most efficient based on current vehicle operation conditions. If option 1 is determined to consume less fuel, the alternator can be de-clutched (shifted to the non-power mode) and the fuel cell can be switched to the Power Mode. Conversely, if option 2 is determined to consume less fuel, the alternator can be clutched (shifted to the power mode) and the fuel cell can be switched to Standby Mode.

Under certain situations the fuel flow rate to the internal combustion engine can be substantially at or near zero. This can occur, for example, when the vehicle is moving and the service brake or engine brake are engaged or accelerator pedal is released and the vehicle is accelerating. These conditions are referred to as "no fueling conditions."

Under no fueling conditions, the alternator can be clutched and provide electrical power without consuming any fuel. In these cases the alternator can use the inertia of the vehicle's powertrain to produce "free" electrical energy.

With reference to FIG. 4, exemplary alternator clutching/de-clutching scenarios are shown. The alternator can be clutched (engaged) or de-clutched (disengaged) from being driven by the engine in response to various alternative conditions. The conditions described below are exemplary as alternative conditions can be used. In FIG. 4, the alternator clutch is shown to have two states, namely alternator clutch disengaged or non-power state indicated by block 220 and alternator clutch engaged or power state indicated by block 240. Assume that the logic starts at the alternator clutch disengage block 220. If the engine is off, the alternator clutch can be on (engaged) or off (disengaged) as the alternator would not be driven by the engine. In FIG. 4, if the engine is off, the alternator clutch is indicated to be off in accordance with logic loop 222. In addition, if the engine is cranking (being started) desirably the alternator clutch is off so that the alternator is not using power otherwise available to crank the engine. This is also indicated by logic loop 222. Assume the engine is running. In this case, from block 220, a logic pathway 224 is followed to a decision node 226. If the fuel cell is in the Startup Mode, the alternator clutch is shifted to the on position as indicated by logic pathway 228 and block 240 is reached with the alternator shown in the alternator clutch engaged state. In addition, if the fuel cell is in the Power Mode and the battery state of charge is less than or equal to a threshold, such as 70%, the alternator clutch is shifted to the on position (power mode) and block 240 is again reached, via logic pathway 230. In this case, the alternator clutch is engaged to provide additional charge for the battery. The exemplary threshold of 70% can be varied. Again, from decision node 226, if the fuel cell is in the Power Mode and the road grade is a steep downhill, such as a downhill grade that is greater than a threshold, the alternator clutch can be shifted to its on or engaged state, indicated by logic pathway 232 from node 226 to the alternator clutch engage block 240. Under these conditions, energy generated by coasting down the hill can be captured by the clutch and stored in the energy storage devices. Also, the alternator torque provides limited braking assistance.

At the alternator clutch engaged block 240, a number of exemplary conditions are indicated for the logic to shift from the alternator clutch engaged block 240 to the alternator clutch disengaged block 220. Logic pathway 242 indicates one set of logic conditions that, if met, result in a shift from block 240 to block 220. Along pathway 242, this shift occurs if the engine is running, the fuel cell is in the Power Mode, the battery state of charge is greater than a threshold (a relatively high charge such as 80%) and a minimum clutch on time logic has been satisfied (such as ten seconds and/or as described below). Under these conditions, power from the fuel cell can be used to meet the requirements of the electrical load of the vehicle and to charge the batteries of the vehicle without requiring power from the alternator. Another such logic pathway 244 from alternator clutch engaged block 240 to alternator clutch disengaged block 220 is shown in FIG. 4. Logic pathway 244 is followed if the engine is running, the fuel cell is in the Power Mode, the battery charge is greater than a threshold, such as greater than 70%, and the minimum clutch on time logic has been satisfied and either the road grade is not equal to a steep downhill grade or the throttle position is greater than 90%. In this example, the threshold state of charge along pathway 244 is less than the threshold state of charge along pathway 242. Under these conditions the engine is operated under high torque demand levels and thus it is desirable to shift the alternator clutch to a disengaged state to provide more power to the engine. The threshold battery charge along path 244 is less than a threshold battery charge along path 242 to allow a broader opportunity for clutch disconnection under these high torque demand conditions.

Thus, FIG. 4 implements a number of aspects in one embodiment. All these aspects can be selected for implementation in different combinations. Thus, for example, if the alternator is in the second non-power mode and the engine is running, the system controller can shift the alternator to the first power mode if at least one condition is met. The at least one condition that is met can comprise any one or more of the following conditions: (a) the fuel cell is in a Startup Mode wherein the fuel cell is not producing electrical energy for distribution to the electrical loads; and (b) the fuel cell is in the Power Mode and the state of charge of the electrical energy storage device is less than a threshold. In addition, the at least one condition that is met further can comprise (c) the fuel cell is in the Power Mode and one or more of the following conditions: (i) the road grade is downhill and steeper than a downhill threshold, (ii) the vehicle has a service brake and the service brake is engaged, and (iii) the vehicle has an engine brake that is active to apply a braking force to the engine. One example of a downhill threshold is a three percent downhill grade.

As another example, if the alternator is in the first power mode and the engine is running, the system controller can shift the alternator to the second non-power mode if at least one condition is met. The at least one condition that is met can comprise: the fuel cell is in the power mode and the battery state of charge is greater than or equal to a threshold. In addition, the at least one condition that is met further can comprise that the alternator has been in the power mode for at least a minimum time period.

As a further example, if the alternator is in the first power mode and the engine is running, the system controller can shift the alternator to the second non-power mode if the state of charge of the energy storage device is greater than a threshold and one or more of the following conditions are met: the road grade is not a downhill grade that is steeper downhill than a threshold, the vehicle has a throttle and the throttle position is greater than a throttle position threshold. As a further aspect of an embodiment, the system controller does not shift the alternator from the first power mode to the second non-power mode unless the alternator has been in the first power mode for a time that is at least a minimum time period.

As a still further example, if the alternator is in the second non-power mode and the engine is running, the system controller shifts the alternator to the first power mode if any one or more of the following conditions are met: (a) the fuel cell is in a Startup Mode wherein the fuel cell is not producing electrical energy for distribution to the electrical loads; and (b) the fuel cell is in the Power Mode and the state of charge of the electrical energy storage device is less than a threshold; and (c) the fuel cell is in the Power Mode and one or more of the following conditions are met: (i) the road grade is downhill and steeper than a downhill threshold; the vehicle has a service brake and the service brake is engaged; and (iii) the vehicle has an engine brake that is active to apply a braking force to the engine; and wherein if the alternator is in the first power mode and the engine is running, the system controller shifts the alternator to the second non-power mode if at least one or more of the following conditions are met: (a) the fuel cell is in the Power Mode and the battery state of charge is greater than or equal to a threshold and the alternator has been in the first power mode for at least a minimum time period; and (b) if the state of charge of the energy storage device is greater than a threshold and the alternator has been in the first power mode for at least a minimum time period; and one or more of the following conditions are met: the road grade is not a downhill grade that is steeper downhill than a threshold, the vehicle has a throttle and the throttle position is greater than a throttle position threshold.

In view of the many possible embodiments to which the principles of the disclosed invention can be applied, it should be recognized that the illustrated embodiments are only examples of the invention and should not be taken as limiting the scope of the invention. There is no requirement that all aspects described herein need be included in an embodiment as novel and non-obvious combinations and sub-combinations of aspects or features are within the scope of the invention. Rather, the scope of the invention is defined by the following claims. We therefore claim as our invention all that comes within the scope and spirit of these claims.

We claim:

1. A vehicle power system comprising:
a plurality of electrical loads that consume electrical energy from the vehicle power system;
an energy storage device for storing electrical energy from the vehicle power system and providing stored electrical energy to the vehicle power system, the energy storage device having a state of charge;
an internal combustion engine;
an alternator, the alternator comprising a first power mode wherein the alternator is driven by the engine to convert mechanical energy from the engine into electrical energy that is provided to the vehicle power system, the alternator comprising a second non-power mode in which the alternator is not providing electrical energy to the vehicle power system;
a fuel cell having a plurality of fuel cell modes comprising a Power Mode wherein the fuel cell converts fuel into electrical energy that is at least selectively provided to the vehicle power system, and at least a second mode wherein the fuel cell does not provide electrical energy to the vehicle power system; and
a vehicle power system controller coupled to the alternator and to the fuel cell and operable to control the production and distribution of electrical energy in the vehicle power system, the controller being configured to, based upon the electrical energy consumption of the electrical loads and the state of charge of the energy storage device, shift the alternator between the first power mode and the second non-power mode and to shift the fuel cell between plural fuel cell modes.

2. The vehicle power system of claim 1 wherein the alternator is a field clutched alternator, wherein the alternator can be switched to the second non-power mode state by opening an external sense circuit and the alternator can be switched to the first power mode state by closing the external sense circuit.

3. The vehicle power system of claim 1 wherein the fuel cell is a solid oxide fuel cell.

4. The vehicle power system of claim 1, wherein the plurality of modes of the fuel cell comprise an Off Mode, a Startup Mode, a Power Mode, and a Shutdown Mode, and wherein the vehicle power system controller controls the shifting of the fuel cell at least from the Off Mode to the Startup Mode and from the Power Mode to the Shutdown Mode.

5. The vehicle power system of claim 1, wherein the engine is a diesel fueled engine and the fuel cell comprises a fuel reformer operable to convert diesel fuel into a hydrogen fuel for the fuel cell.

6. The vehicle power system of claim 1 wherein the system controller is responsive to a plurality of conditions including the state of an on/off signal to control the shifting of the fuel cell between the plurality of modes.

7. The vehicle power system of claim 1 wherein the vehicle power system controller selectively controls the production of energy from the fuel cell and from the alternator to be solely from the fuel cell under conditions wherein the state of charge of the energy storage device is at or above a threshold, wherein the fuel cell is in the Power Mode and has the capacity to supply the electrical energy requirements of all of the electrical loads, and wherein it is more efficient to provide electrical energy from the fuel cell than to provide electrical energy from the alternator.

8. The vehicle power system of claim 7 wherein the vehicle power system controller selectively controls the production of energy to be from both the fuel cell and the alternator under conditions wherein the state of charge of the energy storage device is at or above the threshold, the fuel cell is in the Power Mode, but the fuel cell lacks the capacity to meet the electrical energy requirements of all of the loads.

9. The vehicle power system of claim 1 wherein the vehicle system controller selectively controls the production of electrical energy to be solely from the alternator under conditions wherein the state of charge of the energy storage device is less than a threshold.

10. The vehicle power system of claim 1 wherein if the alternator is in the second non-power mode and the engine is running, the system controller shifts the alternator to the first power mode if at least one condition is met.

11. The vehicle power system of claim 10 wherein the at least one condition that is met comprises any one or more of the following conditions: (a) the fuel cell is in a Startup Mode wherein the fuel cell is not producing electrical energy for distribution to the electrical loads; and (b) the fuel cell is in the Power Mode and the state of charge of the electrical energy storage device is less than a threshold.

12. The vehicle power system of claim 11 wherein the at least one condition that is met further comprises (c) the fuel cell is in the Power Mode and one or more of the following conditions: (i) the road grade is downhill and steeper than a downhill threshold, (ii) the vehicle has a service brake and the service brake is engaged, and (iii) the vehicle has an engine brake that is active to apply a braking force to the engine.

13. The vehicle power system of claim 1 wherein if the alternator is in the first power mode and the engine is running, the system controller shifts the alternator to the second non-power mode if at least one condition is met.

14. The vehicle power system of claim 13 wherein the at least one condition that is met comprises: the fuel cell is in the power mode and the battery state of charge is greater than or equal to a threshold.

15. The vehicle power system of claim 14 wherein the at least one condition that is met further comprises that the alternator has been in the power mode for at least a minimum time period.

16. The vehicle power system of claim 1 wherein if the alternator is in the first power mode and the engine is running, the system controller shifts the alternator to the second non-power mode if the state of charge of the energy storage device is greater than a threshold and one or more of the following conditions are met: the road grade is not a downhill grade that is steeper downhill than a threshold, the vehicle has a throttle and the throttle position is greater than a throttle position threshold.

17. The vehicle power system of claim 1 wherein if the alternator is in the first power mode and the engine is running, the system controller shifts the alternator to the second non-power mode if the state of charge of the energy storage device is greater than a threshold and one or more of the following conditions are met: the road grade is not a downhill grade that is steeper downhill than a threshold, the vehicle has a throttle and the throttle position is greater than a throttle position threshold except that the system controller does not shift the alternator from the first power mode to the second non-power mode unless the alternator has been in the first power mode for a time that is at least a minimum time period.

18. The vehicle power system of claim 1 wherein if the alternator is in the second non-power mode and the engine is running, the system controller shifts the alternator to the first power mode if any one or more of the following conditions are met: (a) the fuel cell is in a Startup Mode wherein the fuel cell is not producing electrical energy for distribution to the electrical loads; and (b) the fuel cell is in the Power Mode and the state of charge of the electrical energy storage device is less than a threshold; and (c) the fuel cell is in the Power Mode and one or more of the following conditions are met: (i) the road grade is downhill and steeper than a downhill threshold; the vehicle has a service brake and the service brake is engaged; and (iii) the vehicle has an engine brake that is active to apply a braking force to the engine; and wherein if the alternator is in the first power mode and the engine is running, the system controller shifts the alternator to the second non-power mode if at least one or more of the following conditions are met: (a) the fuel cell is in the Power Mode and the battery state of charge is greater than or equal to a threshold and the alternator has been in the first power mode for at least a minimum time period; and (b) if the state of charge of the energy storage device is greater than a threshold, the alternator has been in the first power mode for at least a minimum time period, and one or more of the following conditions are met: the road grade is not a downhill grade that is steeper downhill than a threshold, the vehicle has a throttle and the throttle position is greater than a throttle position threshold.

19. A vehicle power system comprising:
an internal combustion engine;
a starter coupled to the internal combustion engine and that is operable to crank the engine in response to delivery of a crank engine current to the starter;
a switchable power output alternator that is operable in response to an alternator control signal to shift from a first power mode in which the alternator is driven by the engine to produce output power at an alternator output and a second non-power mode in which the alternator is not driven by the engine to produce output power;
an energy storage device coupled to the alternator output and to vehicle electrical loads;
a fuel cell coupled to the energy storage device and to the vehicle electrical loads;
a system controller coupled to the fuel cell and to the energy storage device, the system controller being operable to selectively provide alternator control signals to the alternator to control the shifting of the alternator from the first power mode to the second non-power mode and from the second non-power mode to the first power mode, the system controller also being operable to selectively provide an engine start signal to cause the engine to start, the system controller selectively controlling the shifting of the alternator to the first power mode and the starting of the engine so as to control the production of alternator output current, the fuel cell being operable to produce electrical power when the fuel cell is in a Power Mode, the system controller being operable to selectively control the delivery of power from the alternator, power from the fuel cell, and power from both the alternator and the fuel cell to the energy storage device and to the electrical loads.

20. A vehicle power system comprising:
an internal combustion engine;
a starter coupled to the internal combustion engine, the starter being operable to crank the engine to start the engine in response to the delivery of engine cranking electrical current to the starter;
an alternator coupled to the engine and operable to produce an alternator current output when driven by the engine;
an energy storage device that is coupled to the alternator output and to vehicle electrical loads;
a fuel cell that is coupled to the energy storage device and to the vehicle electrical loads, the fuel cell having an electrically powered fuel cell cooler that is selectively operable to cool the fuel cell, the fuel cell comprising an Off Mode in which the fuel cell is not producing output power; a Startup Mode in which the fuel cell is shifted toward an operational state wherein the fuel cell produces output power, a Power Mode in which the fuel cell is at least selectively operable to produce output power; and a Shutdown Mode in which the fuel cell is shifted toward the Off Mode, the fuel cell being responsive to fuel cell mode control signals to shift to selected fuel cell modes;
a system controller coupled to the fuel cell and to the energy storage device, the system controller being operable to provide the fuel cell mode control signals to the fuel cell to control the shifting in the fuel cell to the selected modes; and
wherein the system controller blocks the shifting of the fuel cell from the Off Mode to the Startup Mode under conditions comprising there is not at least enough power in the energy storage device to start the engine from a stopped state.

21. A vehicle power system according to claim 20 wherein the system controller blocks the shifting of the fuel cell from the Off Mode to the Startup Mode under conditions further comprising the engine is not running.

22. A vehicle power system according to claim 20 wherein the system controller is responsive to an on/off command with the system controller providing a fuel cell mode control signal that blocks the shifting of the fuel cell from the Off Mode to the Startup Mode in response to a fuel cell off command.

23. A vehicle power system according to claim 20 wherein the energy storage device comprises at least one battery and wherein the system controller provides a fuel cell mode control signal that blocks the shifting of the fuel cell from the Off Mode to the Startup Mode if the state of charge of the battery is less than a first threshold.

24. A vehicle power system according to claim 23 wherein the system controller provides a fuel cell mode control signal that causes the fuel cell to commence shifting from the Startup Mode to the Shutdown Mode if the state of charge of the battery reaches a second threshold that is less than the first threshold.

25. A vehicle power system according to claim 24 wherein the system controller provides a fuel cell mode control signal to maintain the fuel cell in the Startup Mode if the state of charge of the battery reaches a third threshold that is less than the first threshold and greater than the second threshold, the internal combustion engine is running and the alternator is delivering power to the energy storage device, and wherein the electrical loads comprise hotel loads at a first level with the system controller causing the disconnect of at least selected hotel loads to reduce the magnitude of the electrical loads from the first level.

26. A vehicle power system according to claim 25 wherein the system controller provides a fuel cell mode control signal to maintain the fuel cell in the Startup Mode if the state of charge of the battery reaches a fourth threshold that is less than the first threshold and greater than the second threshold, and the engine is not running, the system controller providing an engine start signal causing power to be delivered to the starter from the energy storage device to start the engine and cause the delivery of power from the alternator to the energy storage device with the fuel cell remaining in the Startup Mode.

27. A vehicle power system according to claim 26 wherein the third and fourth thresholds are the same.

28. A vehicle power system according to claim 27 wherein the system controller provides a fuel cell mode control signal to maintain the fuel cell in the Startup Mode if the battery state of charge reaches the fourth threshold, the engine is running, wherein the alternator comprises a switchable power output alternator that is operable in response to an alternator control signal to shift from a first power mode in which the alternator is driven by the engine to produce output power at an alternator output and a second non-power mode in which the alternator is not driven by the engine to produce output power, and wherein the system controller provides an alternator control signal to the alternator and causes the alternator to shift to the first power mode to provide alternator power, and with the fuel cell remaining in the Startup Mode.

29. A vehicle power system according to claim 28 wherein the system controller is responsive to an on/off command with the off command indicating the fuel cell should be turned off, wherein the system controller provides a fuel cell mode control signal to maintain the fuel cell in the Power Mode if the state of charge of the battery is at or below a fifth threshold even though the system controller has received a fuel cell off command.

30. A vehicle power system according to claim 29 wherein the fifth threshold is greater than the first threshold.

31. A vehicle power system according to claim 29 wherein the system controller provides a fuel cell mode control signal to maintain the fuel cell in the Power Mode if the state of charge of the battery is at or below a sixth threshold and the system controller disconnects at least selected electrical loads from receiving electrical power.

32. A vehicle power system according to claim 31 wherein the system controller provides an engine start signal to cause power to be delivered to the starter from the energy storage device to start the engine, the system controller also causing the delivery of power from the alternator to the energy storage device with the fuel cell remaining in the Power Mode.

33. A vehicle power system according to claim 31 wherein the sixth threshold is equal to the third threshold.

34. A vehicle power system according to claim 32 wherein the system controller causes the reconnecting of the disconnected electrical loads in the event the state of charge of the battery reaches or exceeds a seventh threshold.

35. A vehicle power system according to claim 32 wherein the seventh threshold is equal to the fifth threshold.

36. A vehicle power system according to claim 20 wherein the system controller provides a fuel cell mode control signal to initiate shifting of the fuel cell from the Power Mode to the Shutdown Mode if the state of charge of the battery reaches an eighth threshold level that is greater than the fifth threshold level.

37. A vehicle power system according to claim 36 wherein the eighth threshold level corresponds to a fully charged state of charge of the battery.

38. A vehicle power system according to claim 1 wherein the system controller is operable to provide a fuel cell mode control signal to initiate shifting of the fuel cell from the Shutdown Mode to the Startup Mode if there is at least enough power in the energy storage device to start the engine from a stopped state, the engine is running, and the system controller receives a fuel cell on command.

39. A vehicle power system according to claim 20 wherein the system controller is responsive to a fuel cell off command indicating that the fuel cell should be shut down, wherein the system controller provides a fuel cell mode control signal to initiate shifting of the fuel cell from the Power Mode to the Shutdown Mode in response to the fuel cell off command and if the battery state of charge is at or exceeds a threshold level that is greater than the fifth threshold level.

40. A vehicle power system according to claim 39 wherein the system controller is responsive to a low fuel signal to provide a fuel cell mode control signal to initiate shifting of the fuel cell from the Power Mode to the Shutdown Mode.

41. A vehicle power system according to claim 20 wherein the system controller is responsive to a low fuel signal to provide a fuel cell mode control signal to initiate shifting of the fuel cell from the Power Mode to the Shutdown Mode.

42. A vehicle power system according to claim 20 wherein the alternator comprises an alternator that is continuously driven by the engine to produce an alternator current output whenever the engine is running.

43. A vehicle power system according to claim 20 wherein the alternator comprises a switchable power output alternator that is operable in response to an alternator control signal to shift from a first power mode in which the alternator is driven by the engine to produce output power at an alternator output and a second non-power mode in which the alternator is not drivenly connected to the engine to produce output power, wherein the system controller is operable to selectively provide alternator control signals to the alternator to shift the alternator to the first power mode to control the alternator to produce an alternator output power and to shift the alternator to the non-power mode.

44. A vehicle power system according to claim 43 wherein the alternator comprises a clutched alternator.

45. A vehicle power system according to claim 44 wherein the alternator comprises a field clutched alternator.

46. A vehicle power system comprising:
an internal combustion engine;
a starter coupled to the internal combustion engine, the starter being operable to crank the engine to start the engine in response to the delivery of an engine cranking electrical current to the starter;
an alternator coupled to the engine and operable to produce power at an alternator output;
an energy storage device that is coupled to the alternator output and to vehicle electrical loads;
a fuel cell that is coupled to the energy storage device and to the vehicle electrical loads, the fuel cell having an electrically powered fuel cell cooler that is selectively operable to cool the fuel cell, the fuel cell comprising fuel cell modes comprising an Off Mode in which the fuel cell is not producing output power; a Startup Mode in which the fuel cell is shifted toward an operational state wherein the fuel cell produces output power, a Power Mode in which the fuel cell is at least selectively operable to produce output power; and a Shutdown Mode in which the fuel cell is shifted toward the Off Mode;
the fuel cell being responsive to fuel cell mode control signals to initiate or block shifting between fuel cell modes;
a system controller coupled to the fuel cell and to the energy storage device, the system controller being operable to provide the fuel cell mode control signals to the fuel cell to control the initiating of shifting and blocking of shifting of the fuel cell to at least selected modes of the fuel cell modes; and wherein the system controller provides a fuel cell mode control signal to cause blocking of the shifting of the fuel cell from the Off Mode to the Startup Mode if the engine is not running.

47. A vehicle power system according to claim 46 wherein the system controller provides fuel cell mode control signals to cause blocking of the shifting of the fuel cell from Off Mode to the Startup Mode if any one or more of the following conditions exist: the engine is not running, the charge of the energy storage device is not at least at a first threshold that is sufficient to start the engine from a stopped state, and a fuel cell "on" command is not received by the system controller.

48. A method of controlling a vehicle power system, the vehicle power system comprising a plurality of electrical loads, a battery having a state of charge (SOC), an internal combustion engine with an alternator, a fuel cell having at least an Off Mode, a Startup Mode, a Power Mode and a Shutdown Mode, and an input for receiving commands to switch the fuel cell to the Power Mode or the Off Mode, the method comprising:

when the fuel cell is in the Off Mode:
 if a received command is to switch the fuel cell on Power Mode and the SOC is less than or equal to a first threshold value or the engine is not running, then leaving the fuel cell in the Off Mode;
 if a received command is to switch the fuel cell on Power Mode, the engine is running, and the SOC is greater than the first threshold value , then switching the fuel cell to the Startup Mode;

when the fuel cell is in the Startup Mode:
 if the SOC is less than or equal to a second threshold value, then switching the fuel cell to the Shutdown Mode;
 if the SOC is less than or equal to a third threshold greater than the second threshold value and the engine is not running, then starting the engine;
 if the SOC is less than or equal to the third threshold value and the engine is running and the electrical energy consumption of the electrical loads is greater than a first level, then reducing the electrical energy consumption of the electrical loads below the first level;
 if the temperature of the fuel cell reaches a fuel cell operating temperature, then switching the fuel cell to the Power Mode;

when the fuel cell is in the Power Mode:
 if the SOC is less than or equal to the third threshold value, then reducing the electrical energy consumption of the electrical loads until the SOC reaches a fourth threshold value that is greater than the first threshold value;
 if a received command is to switch the fuel cell off and the SOC is less than or equal to a fifth threshold value, then leaving the fuel cell in the Power Mode;
 if a received command is to switch the fuel cell Power Mode off and the SOC is greater than the fifth threshold value, then switching the fuel cell to the Shutdown Mode;
 if the fuel level is less than a low fuel threshold level, then switching the fuel cell to the Shutdown Mode;

when the fuel cell is in the Shutdown Mode:
 if the temperature of the fuel cell reaches a second temperature at which a fuel cell cooling mechanism can be turned off without damaging the fuel cell, then switching the fuel cell to the Off Mode; and
 if the received command is to switch the fuel cell on, the SOC is greater than the first threshold, the engine is running and the fuel is not less than a low fuel level, switching the fuel cell to the Startup Mode.

49. The method of claim 48 wherein the second threshold value is based on the minimum SOC needed to start the engine and to cool the fuel cell to a level that avoids damage to the fuel cell.

* * * * *